(12) United States Patent
Inoue et al.

(10) Patent No.: US 6,552,997 B1
(45) Date of Patent: Apr. 22, 2003

(54) ROUTER NETWORK, WITH SAVING FUNCTION, FOR SUBORDINATE LAN AT ROUTER FAULT

(75) Inventors: Hideki Inoue, Kawasaki (JP); Hideyasu Kanemaki, Kawasaki (JP); Masaru Murakami, Kawasaki (JP); Ikuo Taoka, Kawasaki (JP); Naoki Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/172,385

(22) Filed: Oct. 14, 1998

(30) Foreign Application Priority Data

Mar. 9, 1998 (JP) .......................................... 10-056311

(51) Int. Cl.⁷ .............................................. H04L 12/26
(52) U.S. Cl. ........................ 370/217; 370/244; 370/401
(58) Field of Search .............................. 370/217, 241.1, 370/244, 401, 402

(56) References Cited

U.S. PATENT DOCUMENTS 5,828,835 A * 10/1998 Isfeld et al. ................ 709/200
5,905,872 A * 5/1999 DeSimone et al. ......... 370/401

FOREIGN PATENT DOCUMENTS

| JP | 7-154429 | 6/1995 |
| JP | 9-98158 | 4/1997 |

* cited by examiner

Primary Examiner—Melvin Marcelo
(74) Attorney, Agent, or Firm—Katten Muchin Zavis Rosenman

(57) ABSTRACT

Disclosed is a router network which, regardless of the format used for a network, ensures that communication with another segment will be maintained, even though a fault may occur at a router. The router network includes a plurality of local area networks (LANs), furnished with routers for independent communication; wherein the plurality of local area networks communicate with each other using the Internet protocol (IP) or the Internet work packet protocol (IPX); wherein a network environment for a subordinate segment serviced by a specific router is established for a different router; and wherein when a fault occurs at the specific router, the different router is used as a proxy router to provide communication support for the subordinate segment of the specific router in accordance with the network environment which was set in advance.

11 Claims, 50 Drawing Sheets

PROXY INFORMATION MANAGEMENT TABLE

| PORT/PATH | LINE TYPE | PROXY TYPE | PORT IP ADDRESS | MAC ADDRESS/PORT/PATH | PROXY STATE |
|---|---|---|---|---|---|
| ① | LAN | TEMPORARY | IIA1 | $A_M1$ | − |
| | | ROUTER B | IIB1 | $B_M1$ * | × |
| ② | LAN | NORMAL | IIIA2 | $A_M2$ | − |
| | | ROUTER B | IIIB2 | $B_M2$ * | × |
| | | ROUTER C | IIIC2 | $C_M2$ * | × |
| ③ | WAN | ROUTER C | XC1 | PORT ③ | × |
| ④ VPI(A4)VCI(A4) | ATM | ROUTER B | YB3 | $V_P A4$   $V_C A4$ | × |
| ⑤ | LAN | NORMAL | IA5 | $A_M5$ | − |

○ : PROXY OPERATION IN PROGRESS
× : NO PROXY OPERATION

FIG. 2

PROXY MAC ADDRESS MANAGEMENT TABLE

FOR PORT ②

| INPUT DESTINATION MAC ADDRESS/PORT/PATH | DESTINATION SOURCE MAC ADDRESS |
|---|---|
| $A_M1, A_M2, A_M5$ | $A_M2$ |
| $B_M1, B_M2, V_P A4, V_C A4$ | $B_M2$ |
| $C_M2$, PORT ③ | $C_M2$ |

FOR PORT ①

| INPUT DESTINATION MAC ADDRESS/PORT/PATH | DESTINATION SOURCE MAC ADDRESS |
|---|---|
| TRANSMISSION OF ARP/PING PACKET | $A_M1$ |
| $B_M1, B_M2, V_P A4, V_C A4$ | $B_M1$ |

FIG. 3

PUBLIC NETWORK CONNECTION DESTINATION TABLE

| PROXY OBJECT ROUTER | CONNECTION SOURCE PORT | CONNECTION DESTINATION PUBLIC NETWORK ADDRESS |
|---|---|---|
| ROUTER C | ③ | 012-345-6789 |

FIG. 4

ATM CONNECTION TABLE

| PROXY OBJECT ROUTER | CONNECTION SOURCE PORT | CONNECTION SOURCE | | CONNECTION DESTINATION | | |
|---|---|---|---|---|---|---|
| | | VPI | VCI | ATM PORT | VPI | VCI |
| ROUTER B | ④ | $V_pA4$ | $V_cA4$ | (E) | $V_pE4$ | $V_cE4$ |

FIG. 5

ROUTING TABLE

NORMAL OPERATION a

| DESTINATION IP ADDRESS | I | II | III | IV | V |
|---|---|---|---|---|---|
| OUTPUT PORT | ⑤ | ② | ② | ② | ② |

ROUTER B MALFUNCTIONING b

| DESTINATION IP ADDRESS | I | II | III | IV | V |
|---|---|---|---|---|---|
| OUTPUT PORT | ⑤ | ① | ② | ② | ④ $V_pA4$ $V_cA4$ |

ROUTER C MALFUNCTIONING c

| DESTINATION IP ADDRESS | I | II | III | IV | V |
|---|---|---|---|---|---|
| OUTPUT PORT | ⑤ | ② | ② | ③ | ② |

ROUTER B AND ROUTER C MALFUNCTIONING d

| DESTINATION IP ADDRESS | I | II | III | IV | V |
|---|---|---|---|---|---|
| OUTPUT PORT | ⑤ | ① | ② | ③ | ④ $V_pA4$ $V_cA4$ |

FIG. 6

LOGICAL PATH MANAGEMENT TABLE

| CONNECTION SOURCE | | | CONNECTION DESTINATION | | | USE STATE | |
|---|---|---|---|---|---|---|---|
| ATM PORT | VPI | VCI | ATM PORT | VPI | VCI | | |
| ① | $V_P A1$ | $V_C A1$ | ③ | $V_P C1$ | $V_C C1$ | ○ | |
| ② | $V_P B1$ | $V_C B1$ | ④ | $V_P D1$ | $V_C D1$ | ○ | ←※1 |
| ① | $V_P A2$ | $V_C A2$ | SELF NODE | | | ○ | ←※2 |

| CONNECTION SOURCE | | | CONNECTION DESTINATION | | | USE STATE | |
|---|---|---|---|---|---|---|---|
| ATM PORT | VPI | VCI | ATM PORT | VPI | VCI | | |
| ① | $V_P A1$ | $V_C A1$ | ③ | $V_P C1$ | $V_C C1$ | ○ | |
| ② | $V_P B1$ | $V_C B1$ | ④ | $V_P D1$ | $V_C D1$ | × | ←※1 |
| ① | $V_P A2$ | $V_C A2$ | ④ | $V_P D1$ | $V_C D1$ | ○ | ←※2 |

FIG. 8B

| CONNECTION SOURCE ||| CONNECTION DESTINATION ||| USE STATE |
| ATM PORT | VPI | VCI | ATM PORT | VPI | VCI | |
|---|---|---|---|---|---|---|
| ① | $V_P A1$ | $V_C A1$ | ③ | $V_P C1$ | $V_C C1$ | ○ |
| ② | $V_P B2$ | $V_C B2$ | ④ | $V_P D1$ | $V_C D1$ | ○ ← ※1 |
| ① | $V_P A2$ | $V_C A2$ | ④ | $V_P D1$ | $V_C D1$ | × ← ※2 |

| CONNECTION SOURCE ||| CONNECTION DESTINATION ||| USE STATE |
| PORT | VPI | VCI | PORT | VPI | VCI | |
|---|---|---|---|---|---|---|
| ① | $V_P A1$ | $V_C A1$ | ③ | $V_P C1$ | $V_C C1$ | ○ |
| ② | $V_P B1$ | $V_C B1$ | ④ | $V_P D1$ | $V_C D1$ | × |
| ① | $V_P A2$ | $V_C A2$ | ④ | $V_P D1$ | $V_C D1$ | ○ |

USE STATE CHANGE ONLY

FIG. 9B

| NODE NAME | MAC ADDRESS | IP ADDRESS |
|---|---|---|
| DTE-a | $a_M$ | I a |
| DTE-b | $b_M$ | II b |
| DTE-c | $c_M$ | IV c |
| DTE-d | $d_M$ | III d |
| DTE-e | $e_M$ | V e |
| ROUTER A-① | $A_M 1$ | II A |
| ROUTER A-② | $A_M 2$ | III A |
| ROUTER A-⑤ | $A_M 3$ | I A |
| ROUTER B-③ | $B_M 1$ | II B |
| ROUTER B-④ | $B_M 2$ | III B |
| ROUTER B-⑥ | $B_M 3$ | V B |
| ROUTER C-⑦ | $C_M 1$ | III C |
| ROUTER C-⑧ | $C_M 2$ | IV C |

PROXY INFORMATION MANAGEMENT TABLE

| PORT/PATH | LINE TYPE | PROXY TYPE | PORT IP ADDRESS | MAC ADDRESS/PORT/PATH | PROXY STATE |
|---|---|---|---|---|---|
| PORT ① | LAN | TEMPORARY | II A | $A_M 1$ | - |
| | | ROUTER B | II B | | × |
| PORT ② | LAN | NORMAL | III A | $A_M 2$ | - |
| | | ROUTER B | III B | | × |
| PORT ⑤ | LAN | NORMAL | I A | $A_M 3$ | - |

FIG. 11

PROXY INFORMATION MANAGEMENT TABLE

| PORT/PATH | LINE TYPE | PROXY TYPE | PORT IP ADDRESS | MAC ADDRESS/PORT/PATH | PROXY STATE | |
|---|---|---|---|---|---|---|
| PORT ① | LAN | TEMPORARY | IIA | $A_M 1$ | – | |
| | | ROUTER B | IIB | $B_M 1$ | × | ←*2 |
| PORT ② | LAN | NORMAL | IIIA | $A_M 2$ | – | |
| | | ROUTER B | IIIB | $B_M 2$ | × | ←*1 |
| PORT ⑤ | LAN | NORMAL | IA | $A_M 3$ | – | |

FIG. 14A

PROXY MAC ADDRESS MANAGEMENT TABLE (PORT ①)

| INPUT DESTINATION MAC ADDRESS/PORT/PATH | TRANSMISSION SOURCE MAC ADDRESS |
|---|---|
| $B_M 1, B_M 2$ | $B_M 1$ |

FIG. 14B

PROXY MAC ADDRESS MANAGEMENT TABLE (PORT ②)

| INPUT DESTINATION MAC ADDRESS/PORT/PATH | TRANSMISSION SOURCE MAC ADDRESS |
|---|---|
| $B_M 1, B_M 2$ | $B_M 2$ |

FIG. 14C

NORMAL OPERATION ROUTING TABLE

| DESTINATION IP ADDRESS | I | II | III | IV | V |
|---|---|---|---|---|---|
| OUTPUT PORT | ⑤ | ② | ② | ② | ② |

FIG. 14D

ROUTER B RIP PACKET

| NETWORK | I | II | III | IV | V |
|---|---|---|---|---|---|
| METRIC | 2 | 1 | 1 | 2 | 1 |

FIG. 14E

PROXY ROUTING TABLE (FOR ROUTER B PROXY)

| DESTINATION IP ADDRESS | I | II | III | IV | V |
|---|---|---|---|---|---|
| OUTPUT PORT | ⑤ | ① | ② | ② | – |

FIG. 14F

PROXY INFORMATION MANAGEMENT TABLE

| PORT/PATH | LINE TYPE | PROXY TYPE | PORT IP ADDRESS | MAC ADDRESS/PORT/PATH | PROXY STATE |
|---|---|---|---|---|---|
| PORT ① | LAN | TEMPORARY | II A | $A_M 1$ | – |
| | | ROUTER B | II B | $B_M 1$ | O |
| PORT ② | LAN | NORMAL | III A | $A_M 2$ | – |
| | | ROUTER B | III B | $B_M 2$ | O |
| PORT ⑤ | LAN | NORMAL | I A | $A_M 3$ | – |

| $B_M 1$ | $b_M$ | III d | II b | DATA |

DESTINATION ADDRESS | TRANSMISSION SOURCE ADDRESS | DESTINATION ADDRESS | TRANSMISSION SOURCE ADDRESS

MAC HEADER | IP HEADER

FIG. 22B

PROXY ROUTING TABLE

| DESTINATION IP ADDRESS | I | II | III | IV | V |
|---|---|---|---|---|---|
| OUTPUT PORT | ⑤ | ① | ② | ② | – |

FIG. 22C

PROXY MAC ADDRESS MANAGEMENT TABLE (PORT ②)

| DESTINATION MAC ADDRESS PORT/PATH | TRANSMISSION SOURCE MAC ADDRESS |
|---|---|
| $B_M 1, B_M 2$ | $B_M 2$ |

FIG. 22D

| $d_M$ | $B_M 2$ | III d | II b | DATA |

FIG. 22E

| $B_M 2$ | $d_M$ | II b | III d | DATA |

FIG. 22F

PROXY ROUTING TABLE

| DESTINATION IP ADDRESS | I | II | III | IV | V |
|---|---|---|---|---|---|
| OUTPUT PORT | ⑤ | ① | ② | ② | – |

FIG. 22G

PROXY MAC ADDRESS MANAGEMENT TABLE (PORT ①)

| DESTINATION MAC ADDRESS PORT/PATH | TRANSMISSION SOURCE MAC ADDRESS |
|---|---|
| $B_M 1, B_M 2$ | $B_M 1$ |

FIG. 22H

| $b_M$ | $B_M 1$ | II b | III d | DATA |

| NODE NAME | MAC ADDRESS | IP ADDRESS |
|---|---|---|
| DTE-a | $a_M$ | Ia |
| DTE-b | $b_M$ | IIb |
| DTE-c | $c_M$ | IVc |
| DTE-d | $d_M$ | IIId |
| DTE-f | $f_M$ | VIIf |
| ROUTER A-② | $A_M 2$ | IIIA |
| ROUTER A-⑤ | $A_M 3$ | IA |
| ROUTER A-P4 | — | — |
| ROUTER B-③ | $B_M 1$ | IIB |
| ROUTER B-④ | $B_M 2$ | IIIB |
| ROUTER C-⑦ | $C_M 1$ | IIIC |
| ROUTER C-⑧ | $C_M 2$ | IVC |
| ROUTER C-⑨ | — | VIC |
| ROUTER D-P0 | — | VIC |
| ROUTER D-P1 | — | VID |
| ROUTER D-P2 | — | VID |
| ROUTER D-P3 | $D_M 1$ | VIID |

FIG. 26A
PROXY INFORMATION MANAGEMENT TABLE

| PORT/PATH | LINE TYPE | PROXY TYPE | PORT IP ADDRESS | MAC ADDRESS/PORT/PATH | PROXY STATE |
|---|---|---|---|---|---|
| PORT ② | LAN | NORMAL | III A | $A_M 2$ | – |
| PORT ② | LAN | ROUTER C | III C |  | × |
| PORT ⑤ | LAN | NORMAL | I A | $A_M 3$ | – |
| PORT P4 | WAN | ROUTER C | VI C | PORT ③ | × |

FIG. 26B
PUBLIC NETWORK CONNECTION DESTINATION TABLE

| PROXY OBJECT ROUTER | CONNECTION SOURCE PORT | CONNECTION DESTINATION PUBLIC NETWORK ADDRESS |
|---|---|---|
| ROUTER C | PORT | 012-345-6789 |

FIG. 26C
PROXY INFORMATION MANAGEMENT TABLE

| PORT/PATH | LINE TYPE | PROXY TYPE | PORT IP ADDRESS | MAC ADDRESS/PORT/PATH | PROXY STATE |
|---|---|---|---|---|---|
| PORT ② | LAN | NORMAL | III A | $A_M 2$ | – |
| PORT ② | LAN | ROUTER C | III C | $C_M 1$ | × |
| PORT ⑤ | LAN | NORMAL | I A | $A_M 3$ | – |
| PORT P4 | WAN | ROUTER C | VI C | PORT ③ | × |

FIG. 26D
PROXY MAC ADDRESS MANAGEMENT TABLE (PORT ②)

| INPUT DESTINATION MAC ADDRESS/PORT/PATH | TRANSMISSION SOURCE MAC ADDRESS |
|---|---|
| PORT P4 | $C_M 1$ |

FIG. 26E
NORMAL OPERATION ROUTING TABLE

| DESTINATION IP ADDRESS | I | II | III | IV | VI | VII |
|---|---|---|---|---|---|---|
| OUTPUT PORT | ⑤ | ② | ② | ② | ② | ② |

FIG. 26F
RIP PACKET OF ROUTER B

| NETWORK | I | II | III | IV | VI | V |
|---|---|---|---|---|---|---|
| METRIC | 2 | 2 | 1 | 1 | 1 | 2 |

FIG. 26G
PROXY ROUTING TABLE (FOR ROUTER C PROXY)

| DESTINATION IP ADDRESS | I | II | III | IV | VI | VII |
|---|---|---|---|---|---|---|
| OUTPUT PORT | ⑤ | ② | ② | – | P4 | P4 |

PROXY INFORMATION MANAGEMENT TABLE

| PORT/PATH | LINE TYPE | PROXY TYPE | PORT IP ADDRESS | MAC ADDRESS/PORT/PATH | PROXY STATE |
|---|---|---|---|---|---|
| PORT ② | LAN | NORMAL | III A | $A_M 2$ | – |
| | | ROUTER C | III C | $C_M 1$ | O  ←*1 |
| PORT ⑤ | LAN | NORMAL | I A | $A_M 3$ | – |
| PORT P4 | WAN | ROUTER C | VI C | PORT ③ | O |

FIG. 29

FIG. 30A TRANSMISSION FRAME
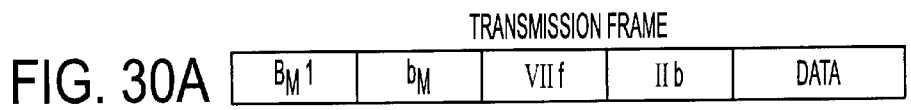

FIG. 30B TRANSMISSION FRAME
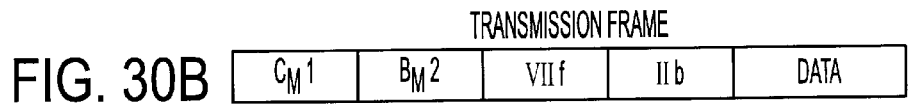

FIG. 30C PROXY ROUTING TABLE

| DESTINATION IP ADDRESS | I | II | III | IV | VI | VII |
|---|---|---|---|---|---|---|
| OUTPUT PORT | ⑤ | ② | ② | – | P4 | P4 |

FIG. 30D INFORMATION FIELD OF FRAME

| VII f | II b | DATA |
|---|---|---|

FIG. 30E TRANSMISSION FRAME

| $f_M$ | $D_M 1$ | VII f | II b | DATA |
|---|---|---|---|---|

FIG. 30F TRANSMISSION FRAME

| $D_M 1$ | $f_M$ | II b | VII f | DATA |
|---|---|---|---|---|

FIG. 30G INFORMATION FIELD OF FRAME

| II b | VII f | DATA |
|---|---|---|

FIG. 30H PROXY ROUTING TABLE

| DESTINATION IP ADDRESS | I | II | III | IV | VI | VII |
|---|---|---|---|---|---|---|
| OUTPUT PORT | ⑤ | ② | ② | – | P4 | P4 |

FIG. 30I PROXY MAC ADDRESS MANAGEMENT TABLE (PORT ②)

| INPUT DESTINATION MAC ADDRESS/PORT/PATH | TRANSMISSION SOURCE MAC ADDRESS |
|---|---|
| PORT P4 | $C_M 1$ |

FIG. 30J TRANSMISSION FRAME
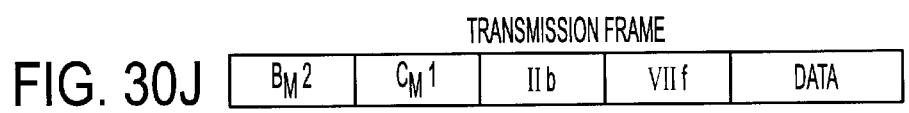

FIG. 30K TRANSMISSION FRAME
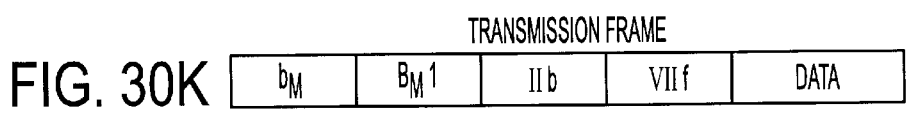

| NODE NAME | MAC ADDRESS | IP ADDRESS |
|---|---|---|
| DTE-a | $a_M$ | I a |
| DTE-b | $b_M$ | II b |
| DTE-c | $c_M$ | III c |
| DTE-d | $d_M$ | IV d |
| ROUTER A-① | $A_M 1$ | I A |
| ROUTER A-② | — | V A |
| ROUTER A-⑨ | $A_M 2$ | II A |
| ROUTER B-③ | $B_M$ | II B |
| ROUTER B-④ | — | V B |
| ROUTER C-⑤ | — | V C |
| ROUTER C-⑥ | $C_M$ | III C |
| ROUTER D-⑦ | — | V D |
| ROUTER D-⑧ | $D_M$ | IV D |
| ATM-E | — | V E |

FIG. 33A

| COMMUNICATION INTERVAL | PHYSICAL CONNECTION PORT NO. | VPI | VCI |
|---|---|---|---|
| DTE-a ~ DTE-c | ROUTER A-②~ATM-P0 | $V_p A$ | $V_c A1$ |
| | ROUTER C-⑤~ATM-P1 | $V_p C$ | $V_c C1$ |
| DTE-b ~ DTE-d | ROUTER B-④~ATM-P2 | $V_p B$ | $V_c B1$ |
| | ROUTER D-⑦~ATM-P3 | $V_p D$ | $V_c D1$ |

FIG. 33B

PROXY INFORMATION MANAGEMENT TABLE

| PORT/PATH | LINE TYPE | PROXY TYPE | PORT IP ADDRESS | MAC ADDRESS/PORT/PATH | PROXY STATE |
|---|---|---|---|---|---|
| PORT ① | LAN | NORMAL | I A | $A_M 1$ | – |
| PORT ⑨ | LAN | TEMPORARY | II A | $A_M 2$ | – |
| | | ROUTER B | II B | | × |
| PORT ② $V_P A$ $V_C A2$ | ATM | ROUTER B | V B | $V_P A$ $V_C A2$ | × |

FIG. 34

ATM CONNECTION DESTINATION TABLE

| PROXY OBJECT ROUTER | PROXY PORT | CONNECTION SOURCE | | CONNECTION DESTINATION | | |
|---|---|---|---|---|---|---|
| | | VPI | VCI | ATM PORT | VPI | VCI |
| ROUTER B | PORT ② | $V_P A$ | $V_C A2$ | P3 | $V_P D$ | $V_C D1$ |

FIG. 35

FIG. 37A PROXY INFORMATION MANAGEMENT TABLE

| PORT/PATH | LINE TYPE | PROXY TYPE | PORT IP ADDRESS | MAC ADDRESS/PORT/PATH | PROXY STATE | |
|---|---|---|---|---|---|---|
| PORT ① | LAN | TEMPORARY | I A | $A_M 1$ | — | |
| PORT ⑨ | LAN | NORMAL | II A | $A_M 2$ | — | |
| | | ROUTER B | II B | $B_M$ | × | ←*1 |
| PORT ② $V_pA$ $V_cA2$ | ATM | ROUTER B | V B | $V_pA$ $V_cA2$ | × | |

FIG. 37B PROXY MAC ADDRESS INFORMATION MANAGEMENT TABLE (PORT ⑨)

| INPUT DESTINATION MAC ADDRESS/PORT/PATH | TRANSMISSION SOURCE MAC ADDRESS |
|---|---|
| $V_pA$-$V_cA2$ | $B_M$ |

FIG. 37C NORMAL OPERATION ROUTING TABLE

| DESTINATION IP ADDRESS | I | III |
|---|---|---|
| OUTPUT PORT | ① | ② |

FIG. 37D RIP PACKET OF ROUTER B

| NETWORK | II | IV |
|---|---|---|
| METRIC | 1 | 2 |

FIG. 37E PROXY ROUTING TABLE (FOR ROUTER B PROXY)

| DESTINATION IP ADDRESS | I | II | III | IV | V |
|---|---|---|---|---|---|
| OUTPUT PORT | ① | ⑨ | ② | ② | — |

FIG. 37F LOGICAL PATH MANAGEMENT TABLE

| CONNECTION SOURCE | | | CONNECTION DESTINATION | | | USE STATE |
|---|---|---|---|---|---|---|
| ATM PORT | VPI | VCI | ATM PORT | VPI | VCI | |
| P0 | $V_pA$ | $V_cA1$ | P1 | $V_pC$ | $V_cC1$ | ○ |
| P2 | $V_pB$ | $V_cB1$ | P3 | $V_pD$ | $V_cD1$ | ○ |
| P0 | $V_pA$ | $V_cA2$ | SELF NODE | | | ○ |

PROXY INFORMATION MANAGEMENT TABLE

| PORT/PATH | LINE TYPE | PROXY TYPE | PORT IP ADDRESS | MAC ADDRESS/PORT/PATH | PROXY STATE | |
|---|---|---|---|---|---|---|
| PORT ① | LAN | NORMAL | I A | $A_M 1$ | — | |
| PORT ⑨ | LAN | TEMPORARY | II A | $A_M 2$ | — | |
| | | ROUTER B | II B | $B_M$ | ◎ | ←*1 |
| PORT ② $V_pA$ $V_CA2$ | ATM | ROUTER B | V B | $V_pA$ $V_CA2$ | ◎ | ←*2 |

FIG. 40

LOGICAL PATH MANAGEMENT TABLE

| CONNECTION SOURCE | | | CONNECTION DESTINATION | | | USE STATE |
|---|---|---|---|---|---|---|
| ATM PORT | VPI | VCI | ATM PORT | VPI | VCI | |
| P0 | $V_P A$ | $V_P A1$ | P1 | $V_P C$ | $V_P C1$ | ○ |
| P2 | $V_P B$ | $V_P B1$ | P3 | $V_P D$ | $V_P D1$ | × ←*2 |
| P0 | $V_P A$ | $V_P A2$ | P3 | $V_P D$ | $V_P D1$ | ○ ←*1 |

FIG. 42

FIG. 44A — TRANSMISSION FRAME

| $B_M$ | $b_M$ | IVd | IIb | DATA |

FIG. 44B — PROXY ROUTING TABLE

| DESTINATION IP ADDRESS | I | II | III | IV | V |
|---|---|---|---|---|---|
| OUTPUT PORT | ① | ⑨ | ② | ② | — |

FIG. 44C — IP FRAME

| IVd | IIb | DATA |

FIG. 44D — LOGICAL PATH MANAGEMENT TABLE

| CONNECTION SOURCE | | | CONNECTION DESTINATION | | | USE STATE |
|---|---|---|---|---|---|---|
| ATM PORT | VPI | VCI | ATM PORT | VPI | VCI | |
| P0 | $V_pA$ | $V_CA1$ | P1 | $V_pC$ | $V_CC1$ | ○ |
| P2 | $V_pB$ | $V_CB1$ | P3 | $V_pD$ | $V_CD1$ | × |
| P0 | $V_pA$ | $V_CA2$ | P3 | $V_pD$ | $V_CD1$ | ○ ←*1 |

FIG. 44E — TRANSMISSION FRAME

| $d_M$ | $D_M$ | IVd | IIb | DATA |

FIG. 44F — TRANSMISSION FRAME

| $D_M$ | $d_M$ | IIb | IVd | DATA |

FIG. 44G — TRANSMISSION FRAME

| IIb | IVd | DATA |

FIG. 44H — LOGICAL PATH MANAGEMENT TABLE

| CONNECTION SOURCE | | | CONNECTION DESTINATION | | | USE STATE |
|---|---|---|---|---|---|---|
| ATM PORT | VPI | VCI | ATM PORT | VPI | VCI | |
| P0 | $V_pA$ | $V_CA1$ | P1 | $V_pC$ | $V_CC1$ | ○ |
| P2 | $V_pB$ | $V_CB1$ | P3 | $V_pD$ | $V_CD1$ | × |
| P0 | $V_pA$ | $V_CA2$ | P3 | $V_pD$ | $V_CD1$ | ○ ←*1 |

PROXY ROUTING TABLE

| DESTINATION IP ADDRESS | I | II | III | IV | V |
|---|---|---|---|---|---|
| OUTPUT PORT | ① | ⑨ | ② | ② | — |

FIG. 45A

PROXY MAC ADDRESS INFORMATION MANAGEMENT TABLE

| OUTPUT PORT | INPUT DESTINATION MAC ADDRESS/PORT/PATH | TRANSMISSION SOURCE MAC ADDRESS |
|---|---|---|
| PORT ⑨ | $V_pA/V_cA2$ | $B_M$ |

FIG. 45B

TRANSMISSION FRAME

| $b_M$ | $B_M$ | IIb | IVd | DATA |
|---|---|---|---|---|

FIG. 45C

LOGICAL PATH MANAGEMENT TABLE

| CONNECTION SOURCE | | | CONNECTION DESTINATION | | | USE STATE |
|---|---|---|---|---|---|---|
| ATM PORT | VPI | VCI | ATM PORT | VPI | VCI | |
| P0 | $V_P A$ | $V_C A1$ | P1 | $V_P C$ | $V_C C1$ | ○ |
| | $V_P B$ | $V_C B1$ | | $V_P D$ | $V_C D1$ | ○ |
| P0 | $V_P A$ | $V_C A2$ | SELF NODE | | | ○ ←* |

LOGICAL PATH MANAGEMENT TABLE

| CONNECTION SOURCE | | | CONNECTION DESTINATION | | | USE STATE |
|---|---|---|---|---|---|---|
| ATM PORT | VPI | VCI | ATM PORT | VPI | VCI | |
| P0 | $V_pA$ | $V_CA1$ | P1 | $V_pC$ | $V_CC1$ | ○ |
| P2 | $V_pB$ | $V_CB1$ | P3 | $V_pD$ | $V_CD1$ | ○ |
| P0 | $V_pA$ | $V_CA2$ | P3 | $V_pD$ | $V_CD1$ | × ← *1 |

FIG. 51B

LOGICAL PATH MANAGEMENT TABLE

| CONNECTION SOURCE | | | CONNECTION DESTINATION | | | USE STATE |
|---|---|---|---|---|---|---|
| ATM PORT | VPI | VCI | ATM PORT | VPI | VCI | |
| P0 | $V_pA$ | $V_CA1$ | P1 | $V_pC$ | $V_CC1$ | ○ |
| P2 | $V_pB$ | $V_CB1$ | P3 | $V_pD$ | $V_CD1$ | × ← *2 |
| P0 | $V_pA$ | $V_CA2$ | P3 | $V_pD$ | $V_CD1$ | ○ ← *1 |

FIG. 51C

LOGICAL PATH MANAGEMENT TABLE

| CONNECTION SOURCE | | | CONNECTION DESTINATION | | | USE STATE |
|---|---|---|---|---|---|---|
| ATM PORT | VPI | VCI | ATM PORT | VPI | VCI | |
| P0 | $V_pA$ | $V_CA1$ | P1 | $V_pC$ | $V_CC1$ | ○ |
| P2 | $V_pB$ | $V_CB1$ | P3 | $V_pD$ | $V_CD1$ | × |
| P0 | $V_pA$ | $V_CA2$ | P3 | $V_pD$ | $V_CD1$ | ○ ← *1 |

FIG. 51D

LOGICAL PATH MANAGEMENT TABLE

| CONNECTION SOURCE | | | CONNECTION DESTINATION | | | USE STATE |
|---|---|---|---|---|---|---|
| ATM PORT | VPI | VCI | ATM PORT | VPI | VCI | |
| P0 | $V_pA$ | $V_CA1$ | P1 | $V_pC$ | $V_CC1$ | ○ |
| P2 | $V_pB$ | $V_CB1$ | P3 | $V_pD$ | $V_CD1$ | ○ ← *1 |
| P0 | $V_pA$ | $V_CA2$ | P3 | $V_pD$ | $V_CD1$ | × ← *2 |

ROUTER NETWORK, WITH SAVING FUNCTION, FOR SUBORDINATE LAN AT ROUTER FAULT

BACKGROUND OF THE INVENTION

1. Field of the Invention

The present invention relates to a router network, having a saving function, for a subordinate LAN (Local Area Network) at a router fault.

2. Related Arts

As a consequence of the recent drastic expansion of the Internet, companies have begun to establish LANs, which employ the local-area Ethernet protocol, for connecting pluralities of personal computers, and have also begun to use routers to interconnect pluralities of LANs and build Intranets.

Commonly employed, for example, are the network configurations shown in FIGS. 52 and 53, wherein segments are allocated for individual organizations and are connected together by a router. In the networks in FIGS. 52 and 53, LAN-I, LAN-II and LAN-III constitute segments, and transmissions must pass through routers A, B and C in order for communication via LAN-IV (FIG. 52), or an ATM switch (FIG. 53), to take place between the segments and the terminals DTE-A, DTE-B and DTE-C of other segments.

When one of the routers A, B and C malfunctions, communication with the other segments may be disabled. To resolve this problem, as is shown in FIGS. 54 and 55, an Intranet, in which two IP routers B and B' having a LAN-WAN-LAN connection format are connected to the same segment (e.g., LAN-II), and a LAN-WAN-LAN setup are well known as configurations which are improved over those in FIGS. 52 and 53.

In this case, so long as the router B' of LAN-II functions regularly, even when the router B malfunctions the network can be connected to another segment via the router B'. However, to do this, a switching function is required by which the "router B" and the "router B'," as routers for communicating with other segments, can be set in the terminal DTE-b in the LAN-II segment, and by which the router B' can be employed when the router B does not respond.

A method has been proposed whereby two routers are mounted in a single segment, with one of them serving as a reserve for the other, and whereby the following operation is performed to ensure that communication with another segment is possible, even without the inclusion of the above described switching function (Japanese Laid-open Patent Publication Nos. Hei 7-154429, Hei 8-256173 and Hei 4-27239).

According to the technique described, for example, in Japanese Laid-open Patent Publication No. Hei 7-154429, the table information shown in FIG. 56 is prepared in the reserve router B'. The tables are an address management information table (FIG. 56A) and a routing table (FIG. 56B)

In the address management table are entered a line type for each port of the reserve router B', and a port IP address and a MAC address both for normal operations and for operations when a fault occurs at the router B. Registered in the routing table are output ports for all of the destination addresses.

An explanation will be given while referring to the network in FIG. 55 for the outline of an operation, for which such table information is employed, performed by a currently employed router and a reserve (extra) router.

(1) First, the reserve router B' constantly monitors the currently employed router B in accordance with an ICMP (Internet Control Message Protocol) ECHO message (hereinafter referred to as a PING packet).

(2) When no response to the PING packet is transmitted by the current router B, operation of the reserve router B', using the same setup as that which is used for the current router B, is initiated to ensure uninterrupted communication with another segment.

However, only when the LAN-WAN-LAN connection format is employed does it appear to the terminal that the same setup is being used for the operation of the current router B and the reserve router B'.

According to the techniques described in Japanese Unexamined Patent Publication Nos. Hei 8-256173 and Hei 4-27239, use of the reserve (extra) router B' is not initiated until the currently employed router B malfunctions, but in this case, since two routers are provided for a single segment, manufacturing costs are increased.

SUMMARY OF THE INVENTION

It is, therefore, one objective of the present invention to provide a configuration whereby, when a fault occurs at one of two or more routers in a network for the common performance of independent IP (Internet Protocol) communication, a different router (hereinafter referred to as a proxy router), which is set in advance to replace the malfunctioning router, can not only provide a normal communication function but also, for a subordinate segment serviced by the malfunctioning router, can continue to provide the same network environment as that available during normal operation with no adverse peripheral affect.

It is another objective of the present invention to provide a router network in which it is not necessary for two routers to be used in a specific segment and a terminal can assume that there is only one router in each segment, so that even when a fault occurs at a dedicated router for a specific segment it is ensured that communication will not be interrupted with any other segment.

It is an additional objective of the present invention to provide a router network which, regardless of the format used for a network, ensures that communication with another segment will be maintained, even though a fault may occur at a router.

To achieve the above objectives, the basic configuration according to the present invention is provided for a router network comprising a plurality of local area networks (LANs), furnished with routers for independent communication, whereby the plurality of local area networks communicate with each other using the Internet protocol (IP) or the Internet work packet protocol (IPX). A network environment for a subordinate segment serviced by a specific router is established for a different router, and when a fault occurs at the specific router, the different router is used as a proxy router to provide communication support for the subordinate segment of the specific router in accordance with the network environment which was set in advance.

When the recovery of the specific router from the fault is detected while the different router is acting as the proxy router, the different router releases the network environment which was set in advance for the subordinate segment of the specific router.

When the different router is being operated as a proxy router, a destination MAC (Media Access Control) address provided for an input frame is employed to determine the MAC address of a transmission source for a frame which is to be output.

In addition, when a frame is received from a port opposite a router connected to a dedicated line or to a public telephone line, while the different router is being operated as a proxy router, the MAC address of the transmission source is determined in accordance with the port at which the frame is input.

Furthermore, when a frame is received from a port opposite a router connected across an asynchronous transfer mode (ATM) network, while the different router is being operated as a proxy router, the MAC address of a transmission source for a frame to be output is determined in accordance with an input port and an input logical path (VPI/VCI: Virtual Path Identifier/Virtual Channel Identifier).

Further, when the different router is being operated as a proxy router, the different router takes the place of the specific router, which has malfunctioned, and transmits an RIP packet to the other routers.

Also, the specific router and the different router are connected to the same ATM network, and through an OAM (Operation, Administration and Maintenance) cell, the different router queries the ATM network setup for a logical path, with a port opposite the specific router where the fault has occurred, which is required in order for the different router to serve as a proxy router for the specific router.

Moreover, the specific router and the different router are connected to the same ATM network, and the different router employs an OAM (Operation, Administration and Maintenance) cell to transmit to the ATM network a path identifier for a router opposite the specific router where the fault has occurred, and queries the ATM network the connection of a logical path in accordance with the path identifier, in order for the different router to serve as a proxy router for the specific router.

Moreover, an ATM switch constituting the ATM network employs as a trigger the OAM (Operation, Administration and Maintenance) cell, which is transmitted by the router, to reset the logical path based on logical path setup information which was registered in advance.

In addition, the logical path is re-set by reading information from the OAM (Operation, Administration and Maintenance) cell transmitted by the router.

The other objectives and features of the present invention will become apparent during the course of the explanation for the following embodiment, which is given while referring to the accompanying drawings.

BRIEF DESCRIPTION OF THE DRAWINGS

FIG. 2 is an example proxy information management table stored in a memory shown in FIG. 1;

FIG. 3 is an example proxy MAC address management table stored in the memory shown in FIG. 1;

FIG. 4 is an example public network connection destination table stored in the memory shown in FIG. 1;

FIG. 5 is an example ATM connection destination table stored in the memory shown in FIG. 1;

FIG. 6 is an example routing table stored in the memory shown in FIG. 1;

FIGS. 8A and 8B are diagrams showing an example logical bus management table stored in a memory shown in FIG. 7;

FIGS. 9A and 9B are diagrams for another example logical bus management table stored in the memory shown in FIG. 7;

FIG. 11 is a proxy information management table in the network shown in FIG. 10;

FIGS. 14A through 14F are diagrams for explaining tables, etc., stored in the memory of a router in the network shown in FIG. 10;

FIG. 20 is an example proxy information management table prepared when a fault occurs at a router B in the network shown in FIG. 10;

FIGS. 22A through 22H are example tables stored in the memory for a router when a fault occurs at a router B in the network shown in FIG. 10;

FIGS. 26A through 26G are example tables stored in the memory of a router in the network shown in FIG. 25;

FIG. 29 is an example proxy information management table prepared from the time a fault occurs at a router C in the network shown in FIG. 35 until another router begins to act as a proxy;

FIGS. 30A through 30K are diagrams showing transmission frames for communications originating in the network shown in FIG. 25 from the time a fault occurred at a router C until another router begins to serve as a proxy, and tables stored in the memory of the router;

FIGS. 33A and 33B are a table in which are entered MAC addresses and IP addresses for individual nodes in the network shown in FIG. 25, and a table in which are entered connection ports for communication segments lying between terminals and VPIs and VCIs which function as connection sources and connection destinations in an ATM switch (E) 1;

FIG. 34 is an example proxy information management table which is prepared when a router A acts as a proxy;

FIG. 35 is an example ATM connection table which is prepared when the router A acts as a proxy;

FIGS. 37A through 37F are tables prepared during the operations performed before the router A acquires the MAC address for the router B;

FIG. 40 is a proxy management table for explaining the processes performed in FIG. 32 from the time a fault occurs at a specific router until another router begins to act as a proxy;

FIG. 42 is a logical path management table for explaining the processing performed in FIG. 32 from the time a fault has occurred at a specific router until another router begins to act as a proxy;

FIGS. 44A through 44H are diagrams of transmission frames and tables employed for the processing shown in FIG. 32 from the time a fault occurs at a specific router until another router begins to act as a proxy;

FIGS. 45A through 45C are diagrams of a routing table, a proxy MAC address management table, and the structure of a transmission frame employed in the processing shown in FIG. 32;

FIG. 48 is a logical path management table at the time of the recovery from the fault in FIG. 32;

FIGS. 51A through 51D are logical path management tables according to a method for establishing in advance a logical path to the ATM switch;

DETAILED DESCRIPTION OF THE PREFERRED EMBODIMENT

Figure 1:
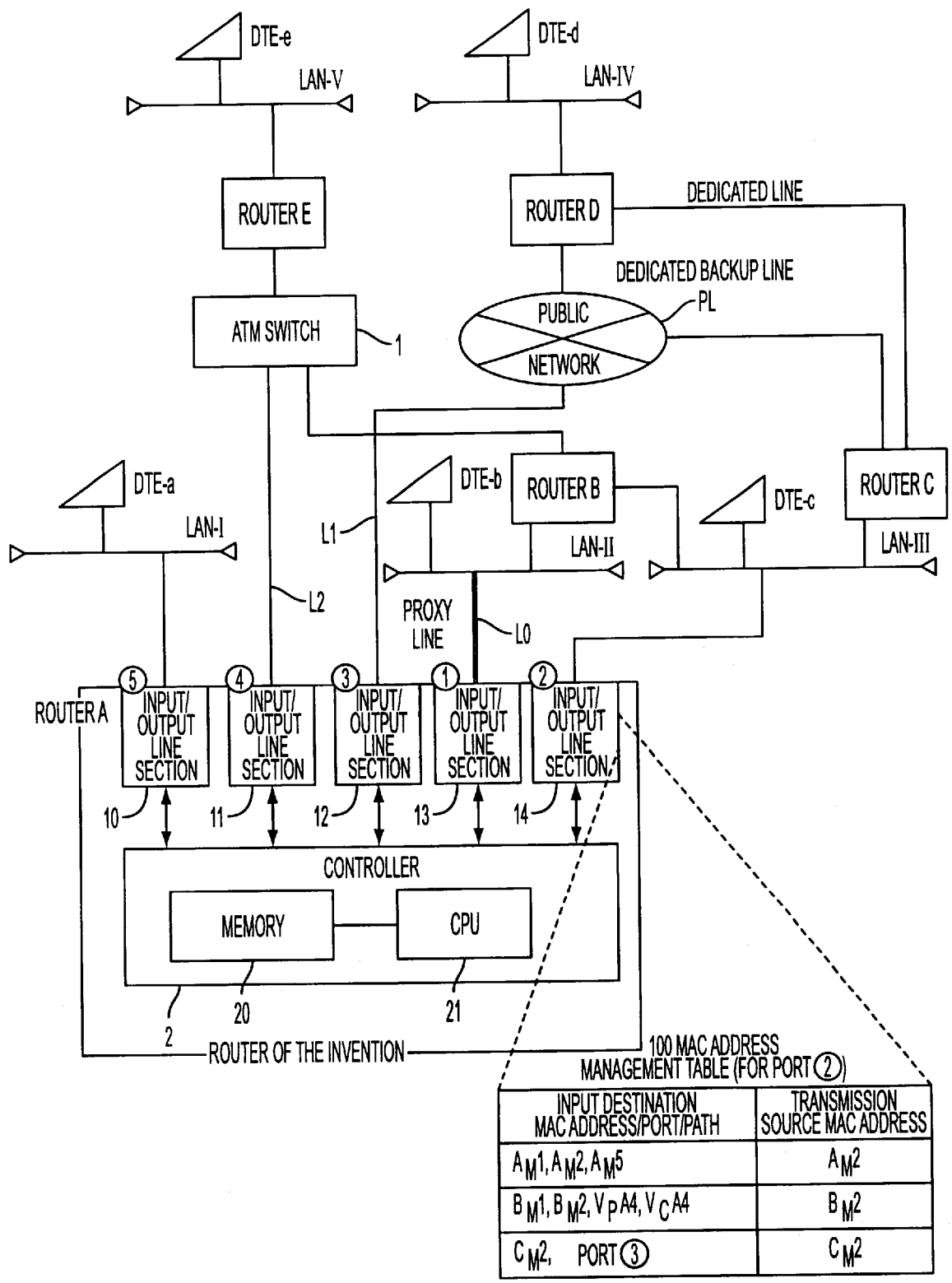
FIG. 1 is a diagram for explaining the principle of a router network, according to the present invention, having an LAN-WAN-LAN connection format wherein a subordinate LAN is saved when a fault occurs at a router.

The preferred embodiment of the present invention will now be described while referring to the accompanying drawings. It should be noted that the same reference numerals are used throughout to denote corresponding or identical components.

FIG. 1 is a diagram for explaining the principle employed for the implementation of a method, according to the present invention, by which a subordinate LAN is saved when a fault occurs at a router. The present invention includes a feature in the structure of a router and in the structure of an ATM (asynchronous transfer mode) switch by which the object of the saving method of the present invention may be achieved.

As shown in FIG. 1, LAN segments, to which are allocated the respective terminals DTE-a to DTE-e, are interconnected across routers A to E. In addition, an ATM switch 1, which includes the feature of the present invention, is connected between the routers A, B and E.

The structure of a router in FIG. 1, by which implementation of the saving function of the present is effected, will now be explained by using a router A as an example. The router A includes a plurality of input/output line sections 10 to 14 for the input/output of IP (Internet Protocol) packets having a form corresponding to the specifications for a medium, which includes such networks as an Ethernet, an ISDN, a Token Ring and an ATM, to which the router is connected.

According to the IPX (Internetwork Packet exchange), the following operation can be performed in the same manner.

First, when the input/output line sections 10 to 14 input/output data for which an MAC (Media Access Control) address is provided (by, for example, an Ethernet or a Token Ring), ARP (Address Resolution Protocol) is employed to acquire, from the input/output line section, an MAC address of a port corresponding to a router (a proxy object router) B, for which the router A acts as a proxy.

The acquired MAC address is recorded in an information management table (which will be described later) stored in a memory 20 of a controller 2. When a fault occurs at the proxy object router B, the router A assumes the function of the router B for the acquisition of data at the MAC address assigned for the pertinent port of the router B.

From among the proxy MAC address management tables, which will be described later, an MAC address management table which corresponds to only one of the input/output line sections 10 to 14 is selected and transmitted to the pertinent input/output line section. In the example in FIG. 1, a corresponding MAC address management table is transmitted to the input/output line section 14 for which a port (2) is provided.

When a fault has occurred at the proxy object router B and the pertinent input/output line section is to output data, since the MAC address/port/path used for input, and a transmission source MAC address used for output are described in the data, the input/output line section examines the received MAC address management table and assumes the function of the port of the router B for the transmission of data in which the MAC address of the port of the router B is described as the transmission source address.

When the input/output line sections 10 to 14 are compatible with the ISDN or the ATM specifications, upon the occurrence of a fault at a proxy object router, the proxy router establishes a path with an opposed router (e.g., router C with its opposed router D, and router B with its opposed router E).

For the ATM switch 1, a new logical path is formed between the routers A and E, and for a dedicated line, a path between routers A and D is established using a backup ISDN line. As a result, a proxy router can assume the function of the malfunctioning router for the reception of data from the opposed router.

The controller 2, which is constituted by a memory 20 and a CPU 21, receives, from the input/output line sections 10 to 14, IP packets having transmission source MAC addresses and returns them to the input/output line sections which are determined in accordance with various setup tables stored in the memory 20, and in addition, stores in the memory 20 various setups for routers.

Also, the controller 2 generates and transmits an RIP packet to prepare a routing table which will be described later, and receives an RIP packet to be entered in the routing table.

Furthermore, when an RIP packet does not correctly arrive at the controller 2, it transmits a PING packet to a router registered in a proxy information management table, which will be described later. When there is no response to the PING packet, the controller 2 enters in the "proxy state" column of the proxy information management table the state (a fault state) which exists when the pertinent router can not send a response earlier than the other routers (a fault has occurred).

Further, the controller 2 employs as a trigger the shifting of the "proxy state" recorded in the proxy information management table to perform operations associated with various other tables, which will be described later.

The memory 20, which is a magnetic disk, a semiconductor memory, etc., is used to store various setup tables, which are required for the present invention and which will be described later, and has a buffer function for the temporary storage of data received from the input/output line sections 10 to 14.

The CPU 21 again transfers the data in the memory 20 to the input/output line sections 10 to 14 in accordance with various setup tables, stored in the memory 20, which are required for the present invention.

FIGS. 2 to 6 are example tables which are registered in the memory 20. In FIG. 2 is shown a proxy information management table which is stored in the memory 20. In this table, port media (line types), proxy types which represent proxy object routers, and original IP addresses and MAC addresses are entered for individual ports (1) to (5) of the input/output line sections 10 to 14.

When one port is set as a proxy for a specific port of another router, in addition to the original setup for that port an IP address is set for a proxy object router.

The MAC address (marked with an * in the table) for the proxy object router is not set manually. Instead, before a fault occurs at a proxy object router, the router A refers to this table and, by issuing an ARP command, collects an MAC address for the proxy object router.

While the router B is operating normally, only the operations for the transmission of an ARP packet and an ICMP packet, and for the receipt of an RIP packet are performed at a port for which the "proxy type" is "temporary." This port is employed to ensure that communication between the LAN-II segment and other segments is available when a fault occurs at the router B.

For a port, such as an ATM, having a plurality of logical paths with a single physical line, various setups for a proxy object router are employed for each logical path (VPI or VCI).

When the logical path of the ATM line and the port of the ISDN line are connected to opposed routers, an MAC address corresponding to the pertinent port/pertinent logical path is not employed. Therefore, instead of the MAC address, an identifier for the pertinent port/logical path is registered in the MAC address column. In the example in FIG. 2, the VPIs and the VCIs of the pertinent port number and the pertinent logical path are set.

As previously mentioned for the controller 2, when the router according to the present invention determines that a proxy object router has malfunctioned, it enters ".: proxy operation in progress" in the "proxy state" column and, in association with the other tables, performs an operation as a proxy router.

In FIG. 3 is shown a proxy MAC address management table, for individual ports, which is stored in the memory 20 (in FIG. 3, ports (1) and (2) are employed). When a fault occurs at a proxy object router, a router according to the present invention must assume its functions for the transmission and the reception of data.

The proxy MAC address management table in FIG. 3 is referred to in order to set, for data to be output, the same MAC address as that employed for a proxy object router.

The contents in the proxy MAC address management table are transmitted to corresponding input/output line sections for use as transmission source MAC address determination tables for individual ports. In addition, these tables are used by the input/output line sections to determine transmission source MAC addresses for the transmission of data by a proxy object router.

The proxy MAC address management table in FIG. 3 is generated for individual ports which are set in the proxy information management table and which employ MAC addresses (ports for line type "LAN" in the table).

As is apparent from the information in the proxy MAC address management table for port (2) in FIG. 1, three MAC addresses ($A_M2$, $B_M2$ and $C_M3$) from the proxy information management table in FIG. 2 could be transmitted as transmission source addresses.

The following process is performed to generate the proxy MAC address management table in FIG. 3 when data are transmitted by the port (2) while serving as a proxy for the router B.

A) The "transmission source MAC address" ($B^M2$), for the proxy MAC address management table in FIG. 3, is entered in the "MAC address/port/path" column for port (2) in the proxy information management table in FIG. 2 when "router B" is set as the proxy type.

B) The "MAC address/port/path" column in the proxy information management table in FIG. 2 for "router B," which is entered as the proxy type, is set as a "destination MAC address" ($B_M1$, $B_M2$, $V_PA4$ and $V_CA4$) in the proxy MAC address management table in FIG. 3.

As for the port for which "temporary" is entered as the proxy type in the proxy information management table in FIG. 2, the original MAC address of that port is employed only for transmission of an ARP packet/an ICMP packet.

In FIG. 4 is a public network connection destination table stored in the memory 20. When "WAN" is set in the line type column in the proxy information management table in FIG. 2, a public network address is so determined that, when a fault occurs at a proxy object router, a path extending to an opposed router can be designated in the public network.

When the "proxy state" in the proxy information management table in FIG. 2 is shifted to ".: operating as proxy," information indicating that a corresponding "line type" is a "WAN" and a corresponding "proxy type" is a "router X" is obtained. In accordance with the "WAN" entry, the public network connection table in FIG. 4 is examined, and a call is issued to obtain a connection destination for the router X in order for it to establish a path with its opposed router. In the example in FIG. 4, the router C is employed as the router X.

In FIG. 5 is shown an ATM connection destination table stored in the memory 20. When "ATM" is set as the line type in the proxy information management table in FIG. 2, in the ATM connection destination table are set a connection source VPI/VCI and a connection destination VPI/VCI with which, upon the occurrence of a fault, the proxy object router can establish the path with its opposed router using the ATM switch.

When the "proxy state" in the proxy information management table in FIG. 2 is shifted to ".: operating as proxy," information indicating that a corresponding "line type" is an "ATM" and a corresponding "proxy type" is a "router X" is obtained. In accordance with the "ATM" entry, the ATM connection destination table in FIG. 5 is examined. The connection source VPI/VCI in the ATM connection destination table is set in the header of an OAM cell, and the connection destination VPI/VCI is set in the data field. Then, according to the present invention, the resultant OAM cell is transmitted to the ATM switch 1. Upon receiving the OAM cell, the ATM switch 1 establishes a logical path with a connection destination which corresponds to the router X.

The routing table in FIG. 6 is one of the tables stored in the memory 20. During the normal operation "a," performed by the proxy router B, RIP packets from the individual routers are accepted to prepare a routing table for a normal operation. The packets received from the input/output line sections 10 to 14 are routed in accordance with the routing table for a normal operation, and are transmitted to appropriate input/output line sections.

In addition, routing tables are prepared that are the equivalent in number to combinations when a fault occurs at the proxy object routers described in the "proxy type" column of the proxy information management table in FIG. 2. In the example in FIG. 6, routing tables b, c and d are prepared for a fault at router B, a fault at router C, and a fault at routers B and C.

The routing tables in FIG. 6 can be prepared using RIP packets received from the individual routers during a normal operation, as all the proxy object routers are adjacent routers.

The packets received from the input/output line sections 10 to 14 are routed in accordance with the routing table "a" for a normal operation, and are transmitted to appropriate input/output line sections. However, when the "proxy state" in the proxy information management table in FIG. 2 is shifted to ".: operating as proxy," the proxy object router, the state for which is shifted to., employs the routing tables b to d to perform routing when a fault occurs.

[General Operation of the Present Invention]

With the assumptions described and made above, the general operation of a network according to the present invention will now be described.

In FIG. 1, the input/output line section 13 (port (1)) in router A is connected to the LAN-II segment across a proxy line L0. When the router B is functioning normally, the proxy line L0 is used only for the transmission of an ARP (Address Resolution Protocol) packet and an ICMP packet, and for the reception of an RIP (Routing Information Protocol) packet. When the router B malfunctions, the proxy line L0 is used to provide communication between the LAN-II segment and other segments is possible.

When an RIP packet from router B is not received, or if there is no response to a PING packet, the router A determines that a fault has occurred at the router B.

When the router A ascertains that the router B has malfunctioned, it also permits the input/output line section 13 to receive the data in the LAN-II segments which were to be transmitted to the router B. The received data are processed internally (which will be described later) and the resultant data are transmitted thereafter by the input/output line sections 10, 11, 12 and 14. In this fashion, the router A acts as the proxy for the router B.

When the recovery of the router B is detected, the router A ceases to receive the data in the LAN-II segment which are to be transmitted to the router B.

The input/output line section 12 is connected to the router D along a line L1 and across a public network PL. The line L1 is not employed during the normal operation of the router C. When a fault occurs at the router C, the line L1 is used to continue to provide communication between the LAN-IV segment and the other segments.

When the router A ascertains a fault has occurred at the router C by using the same detection method employed for detecting a fault at the router B, the input/output line section 12 issues a call from a public network (PL) address, which is registered in advance in the router A, and is connected to the router D. Thus, the data in the LAN-IV segment which were to be transmitted to the router D are received by the input/output line section 14. The received data are processed internally (which will be described later) and the resultant data are transmitted thereafter by the input/output line sections 10, 11, 13 and 14. In this fashion, the router A acts as the proxy for the router C.

When the recovery of the router C is detected, the line is disconnected from the router D, and the router D ceases to receive the data in the LAN-IV segment which are to be transmitted to the router C.

The input/output line section 11, via the ATM switch 1, is connected to the router E across the public network PL. The line L2 is not employed during the normal operation of the router B. When the router B malfunctions, the line L2 is used to continue to provide communication between the LAN-V segment and the other segments.

When the router A ascertains in the above described manner that a fault has occurred at the router B, the router A employs this event as a trigger for instructing the establishment of a logical path between the input/output line section 11 and the router E, and as information for an OAM (Operation, Administration and Maintenance) cell.

The ATM switch 1 according to the present invention establishes a logical path between the routers A and E based on information contained in an OAM cell it receives from the router A. With this setup, the data in the LAN-V segment which were to be transmitted to the router B are received by the input/output line section 11. The received data are internally processed (which will be described later) and the resultant data are transmitted by the input/output line sections 10, 11, 12 and 14. In this fashion, the router A acts as the proxy for the router B.

When the recovery by the router B is detected, the router A uses an OAM cell to instruct the ATM switch 1 to cancel the logical path between the routers A and E, and to reestablish the original logical path between the routers B and E. Thus, the router A ceases to receive data in the LAN-V segment which are to be transmitted to the router B.

[Operating Principle for Employment of ATM Switch 1]

The principle of the internal operation of the ATM switch 1 according to the present invention will now be described while referring to FIGS. 7 and 8.

Figure 7:
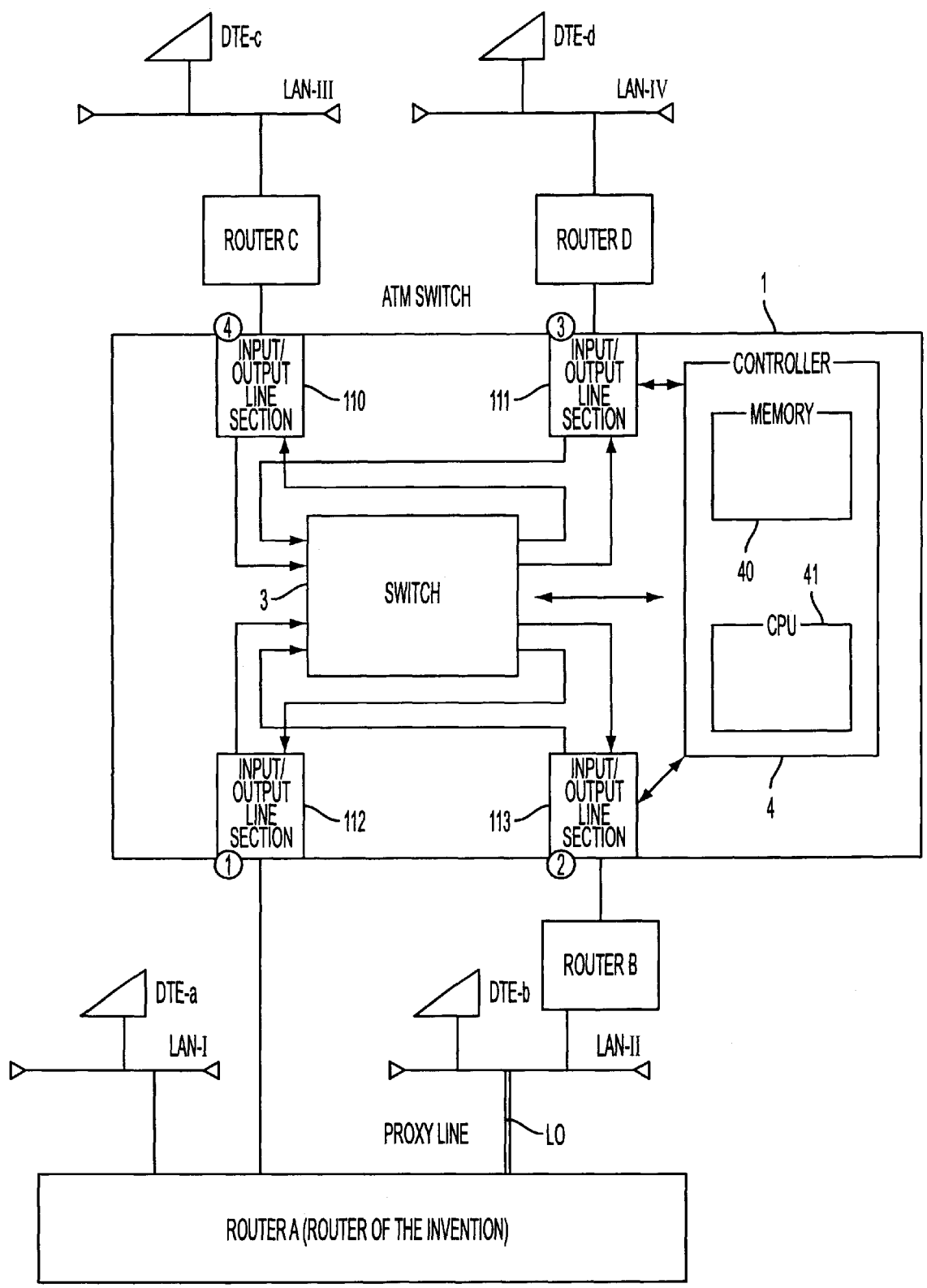
FIG. 7 is a diagram for explaining the internal operating principle when an ATM switch 1 according to the embodiment is employed.

In FIG. 7, the ATM switch 1 of the present invention includes input/output line sections 110 to 113 for respective ports (4), (3), (2) and (1) to enable the input/output of an ATM cell. When the ATM switch 1 receives an OAM cell, it provides a corresponding input port number for the OAM cell and transmits it to a controller 4 which will be described later.

The switch 3 extracts the input port numbers and the VPI/VCIs included in the headers for the ATM cells, which are received from the input/output line sections 110 to 113, and outputs them to adequate input/output line sections. As will be described later, in accordance with an instruction from the controller 4 the input port number for the ATM cell and the output destination described by the VPI/VCI can be changed (the logical path control).

The controller 4 includes a memory 40 and a CPU 41, and uses a logical path management table, which will be described later, to control the logical path of the switch 3. The controller 4 also employs the contents of the OAM cell with the input port number, which is received from the switch 3, to control the logical path for the switch 3.

The memory 40 is a magnetic disk or a semiconductor memory which is used to store various tables which are required for the present invention and which will be described later.

The CPU 41 issues an instruction to the switch 3 in accordance with various tables which are stored in the memory 40 and are required for the present invention, and acquires information from the switch 3.

In FIG. 8 is shown a logical path management table, which is stored in the memory 40 in the controller 4, for managing the correspondence between a VPI/VCI for an input destination and a VPI/VCI for an output destination selected by the switch 3, part of the ATM switch 1 of the present invention.

When an OAM cell is received from a router according to the present invention, a port number and a VPI/VCI included in the information field of the OAM cell are employed to examine the logical path management table in FIG. 8. When the connection destination in a row indicated by an arrow *1 in FIG. 8A is pertinent, as is shown in FIG. 8B, "x: unused" is entered in the corresponding "use state" column (arrow *1 in FIG. 8B).

The pertinent table is examined using the VPI/VCI included in the header field of the OAM cell and the port number received by the ATM switch 1. As is shown in FIG. 8B, the connection destination in the column indicated by an arrow *2 in FIG. 8A is changed from "self-node" to the port number and the VPI/VCI described in the information field of the OAM cell, and thereinafter ".: currently in use" is maintained in this column. As a result, as is indicated by the arrow *2 in FIG. 8B, the logical path management table is reset, and the setup is reflected to the switch 3.

In FIG. 9 is shown another example logical path management table. As is shown in FIG. 9A, a port and a VPI/VCI in the ATM switch 1, which are used when a fault occurs at a router which is connected to the router A via a logical path, may be entered in advance in the logical path setup table.

When the OAM cell for which a specific VPI/VCI is included in the header field is received from the router of the present invention, the logical path management table is examined. As is shown in FIG. 9B, "unused" is entered in the "use state" column for a matched connection destination indicated by an arrow *1 in FIG. 9A.

The port and the VPI/VCI in the other matched column are employed to examine the logical path management table, and as is shown in FIG. 9B, "in use" is entered in the column indicated by an arrow *2 in FIG. 9A, which matches the port and the VPI/VCI. As a result, as is shown in FIG. 9B, the logical path management table is reset, and the setup is reflected to the switch 3.

A detailed explanation will now be given for an example operation when the ATM switch 1 of the present invention is employed. For the connection of the routers A and C, the ATM switch 1, according to the present invention, which is shown in FIG. 7 establishes a logical path between the input/output line sections 112 and 110 of the ATM switch 1, and provides communication along that logical path. For the routers B and D, the ATM switch 1 establishes a logical path between the input/output line sections 113 and 111 of the ATM switch 1 and provides communication along the logical path.

The router B is connected to the router A via a proxy line L0. When the router A detects a fault at the router B, in order to ensure communication with the LAN-IV segment is provided the router A performs the same operation as was explained while referring to FIG. 1 and receives in the LAN-IV segment the data which was to be transmitted to the router B. In addition, an instruction is issued using the OAM cell to again establish a logical path between the input/output line sections 112 and 111 of the ATM switch 1.

Upon receiving the OAM cell, the ATM switch 1 again establishes a path with the VPI/VCI, along which the OAM cell has been received, which is the logical path "router B to ATM switch 1 to router D."

As a result the data in the LAN-IV segment which were to be transmitted to the router B are received by the router A, which then acts as the proxy for the router B.

When the router A determines that the router B has recovered from the fault, the router A does not need to ensure that communication is provided between the LAN-II segment and the LAN-IV segment, and ceases, therefore, to receive the data in the LAN-IV segment which is to be transmitted to the router B. In addition, the router A transmits to the ATM switch 1 an OAM cell indicating that the logical path between the input/output line sections 112 and 111 of the ATM switch 1 has been canceled, and that the logical path between the input/output line sections 113 and 111 should be again established.

Upon receiving the OAM cell, the ATM switch 1 resets the logical path "router A to ATM switch 1 to router D" to the logical path "router B to ATM switch 1 to router D."

Embodiment

The preferred embodiment of the present invention will now be described by referring to the following four cases.

The first case is one wherein the subordinate network of a proxy object router is only a LAN.

The second case is one wherein the subordinate networks of a proxy object router are a LAN and a WAN.

The third case is one wherein the subordinate networks of a proxy object router are a LAN and an ATM (a proxy path is not registered in the ATM switch).

The fourth case is one wherein the subordinate networks of a proxy object router are a LAN and an ATM (a proxy path is registered in the ATM switch).

Case wherein a Subordinate Network of a Proxy Object Router is Only a LAN

Figures 10A, 10B:
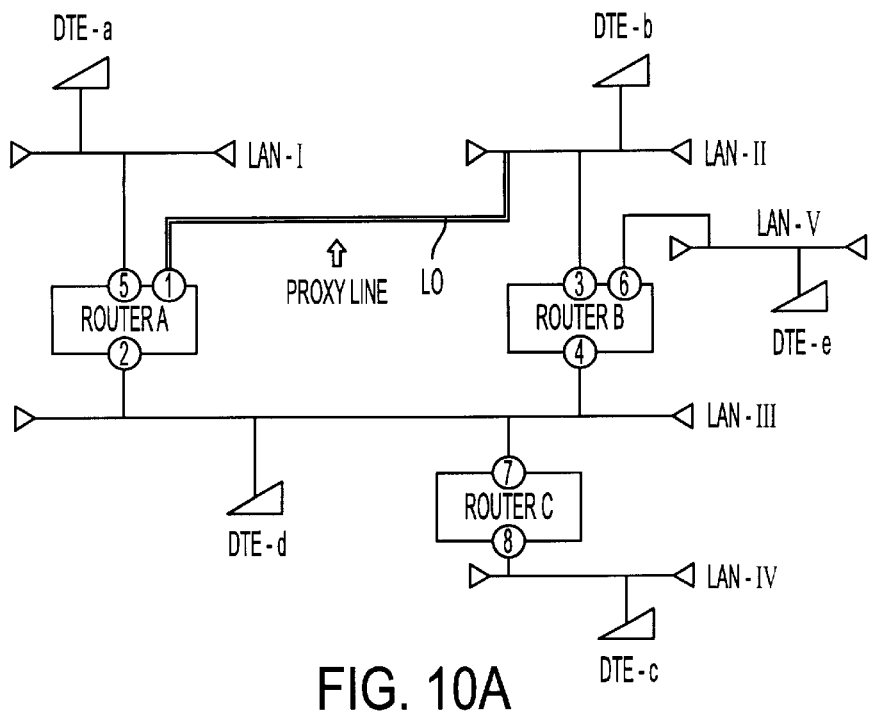
FIG. 10A is a block diagram illustrating an example configuration for a network when a subordinate network for a proxy object router is only a LAN.
FIG. 10B is a table showing nodes and corresponding MAC addresses and IP addresses.

The preferred embodiment of the present invention will be explained by using an example wherein, for the network shown in FIG. 10A, terminal DTE-b communicates with terminal DTE-d when a fault occurs at the router B, and the router A acts as the proxy for the router B. The MAC addresses and IP addresses for the individual notes in the network in FIG. 10 are those shown in FIG. 10B.

As assumptions, (1) terminals DTE-a to DTE-e on the network do not have a function for registering two or more gateways or a function for changing a gateway in response to an ICMP-Redirect Message; and (2) the router A, when acting as a proxy, has the proxy information management table which was explained while referring to FIG. 2 and which is shown in FIG. 11, wherein proxy IP addresses, ports used when acting as a proxy, and types of connections available with a proxy object router are entered in the proxy information management table (the shaded portion in the table in FIG. 11).

Figure 12:
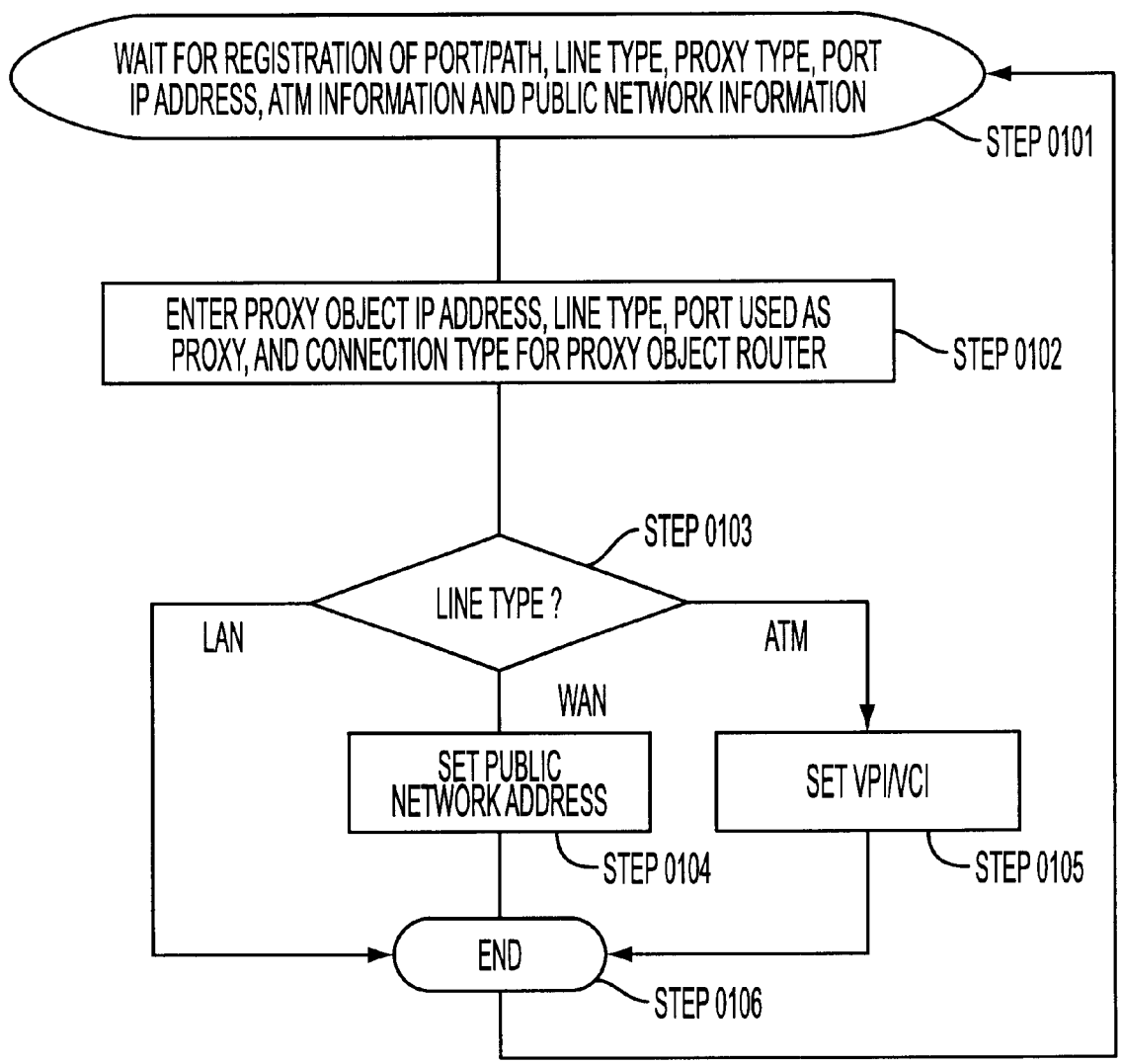
FIG. 12 is a flowchart showing the processing for a registration in the proxy information management table in the network shown in FIG. 10.

The registration of the proxy information management table is performed in accordance with the proxy information management table registration processing in FIG. 12. Specifically, in FIG. 12, in the waiting state for the registration of a "port/path" (STEP 0101), a "line type," a "proxy type," a "port IP address," ATM information and public network information, the proxy object IP address, the line type, the port used as a proxy, and the connection type used with a proxy object router are entered (STEP 0102). Since it is ascertained that the line type is a LAN (STEP 0103), the processing is terminated.

As an additional assumption, (3) a proxy port is used for reception, but not for transmission (excluding an ARP packet).

Operation Performed by Router a Before a Fault Occurs at Router B

With the assumptions described and made above, (1), (2) and (3), the operation performed by the router A before a fault occurs at the router B will now be explained.

Figure 13A:
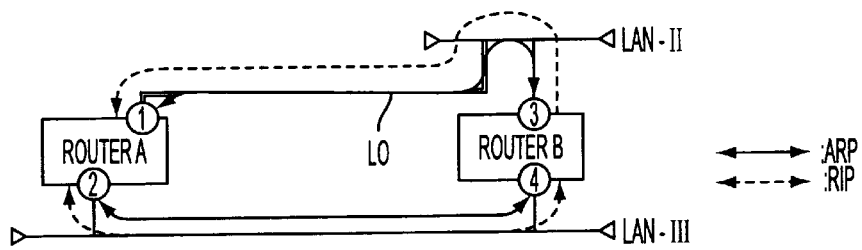
FIGS. 13A and 13B are specific diagrams showing the operation performed by a router A before a fault occurs at a router B in the network shown in FIG. 10.
Figure 13B:
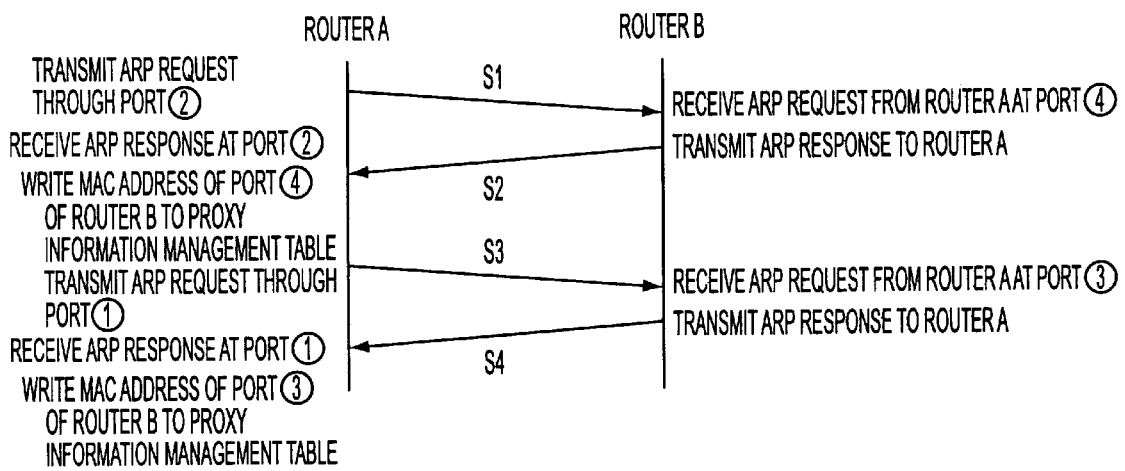

As is shown in the specific diagram in FIG. 13A and in the operating sequence in FIG. 13B, in accordance with normal procedures, the router A transmits an ARP (Address Resolution Protocol) request packet through port (2) (step S1), and receives an ARP response from the router B. Then, the router A collects MAC address information BM2 for port (4) of the router B, and enters it in the proxy information management table in FIG. 14A (row indicated by an arrow *1 in FIG. 14A) (step S2).

In addition, the router A transmits an ARP request packet through the port (1) across the proxy line L0 to the port (3) of the router B (step S3), and collects MAC address information BM1 for the port (3) of the router B and enters it in the proxy information management table in FIG. 14A (row indicated by an arrow *2 in FIG. 14A) (step S4).

At this time, the router A transmits an ARP packet using the MAC address ($A_M1$) for the port (1) and the assigned IP address (IIA) in the LAN-II. However, since the connection type in the proxy information management table in FIG. 11 is "temporary," the router A only responds to its own ARP, and does not even respond to a frame whose MAC address is directed to the router A.

Figure 15:
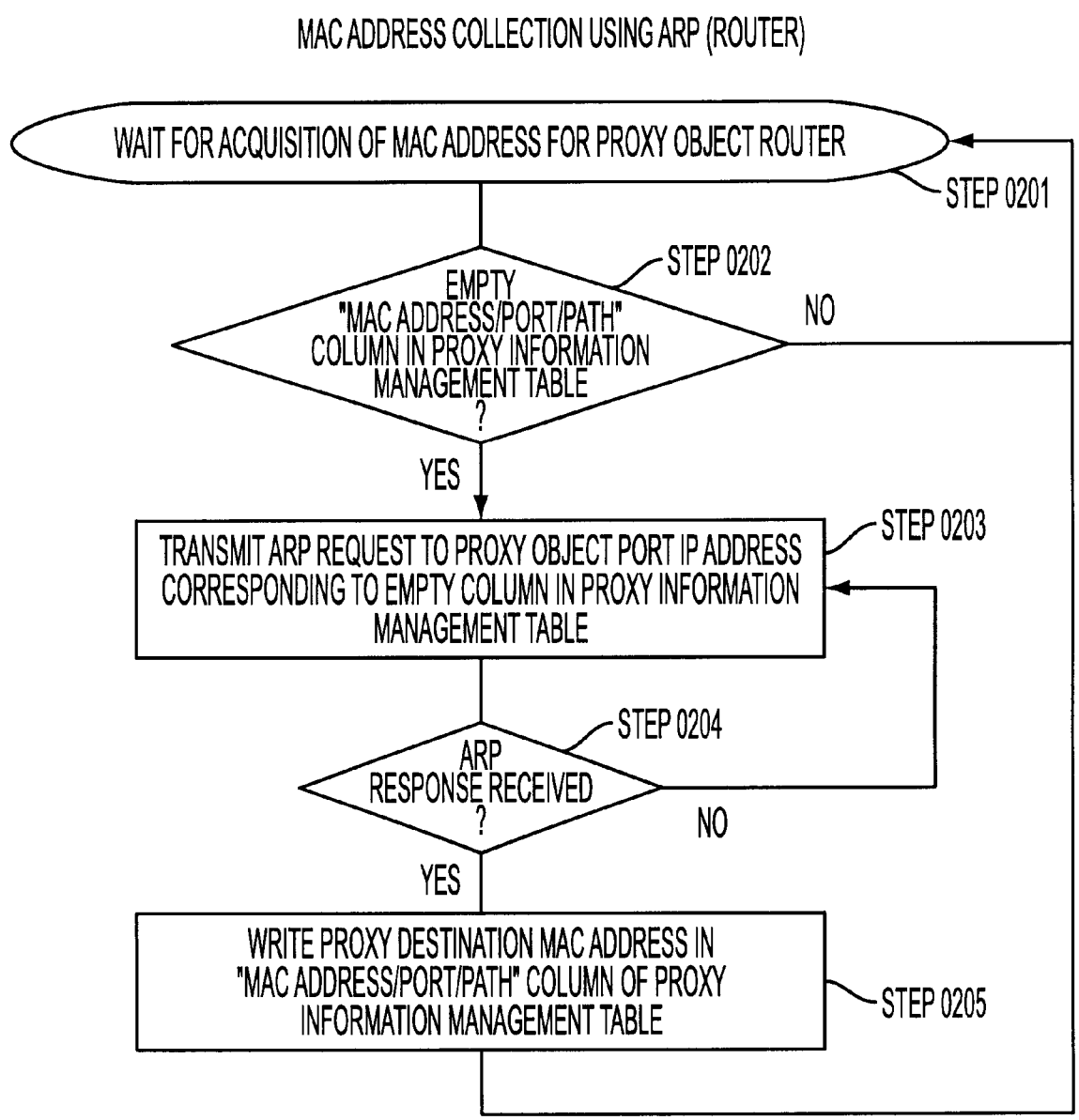
FIG. 15 is a flowchart showing the processing performed according to the ARP for collecting MAC addresses in the network shown in FIG. 10

The general processing in FIG. 13 is performed in accordance with the sequence shown in FIG. 15. Specifically, the router A waits for the acquisition of the MAC address for the proxy object router B (STEP 0201), and a check is performed to determine whether the "MAC address/port/path" column in the proxy information management table in FIG. 14A is empty (STEP 0202).

When there is an empty row in the proxy information management table, an ARP request packet is transmitted to the proxy object management port IP address which corresponds to the empty column (STEP 0203). When an ARP response is received from the proxy object management port IP address (STEP 0204), the proxy object MAC address is entered in the "MAC address/port/path" column in the proxy information management table (STEP 0205).

Based on the proxy information management table in FIG. 14A, which is now filled, during the proxy routing, a "proxy MAC address management table is prepared to manage input destination MAC addresses (FIG. 14B) and transmission source MAC addresses (FIG. 14C) which are added for output, and is transferred to the individual ports for storage thereat.

Figure 16:
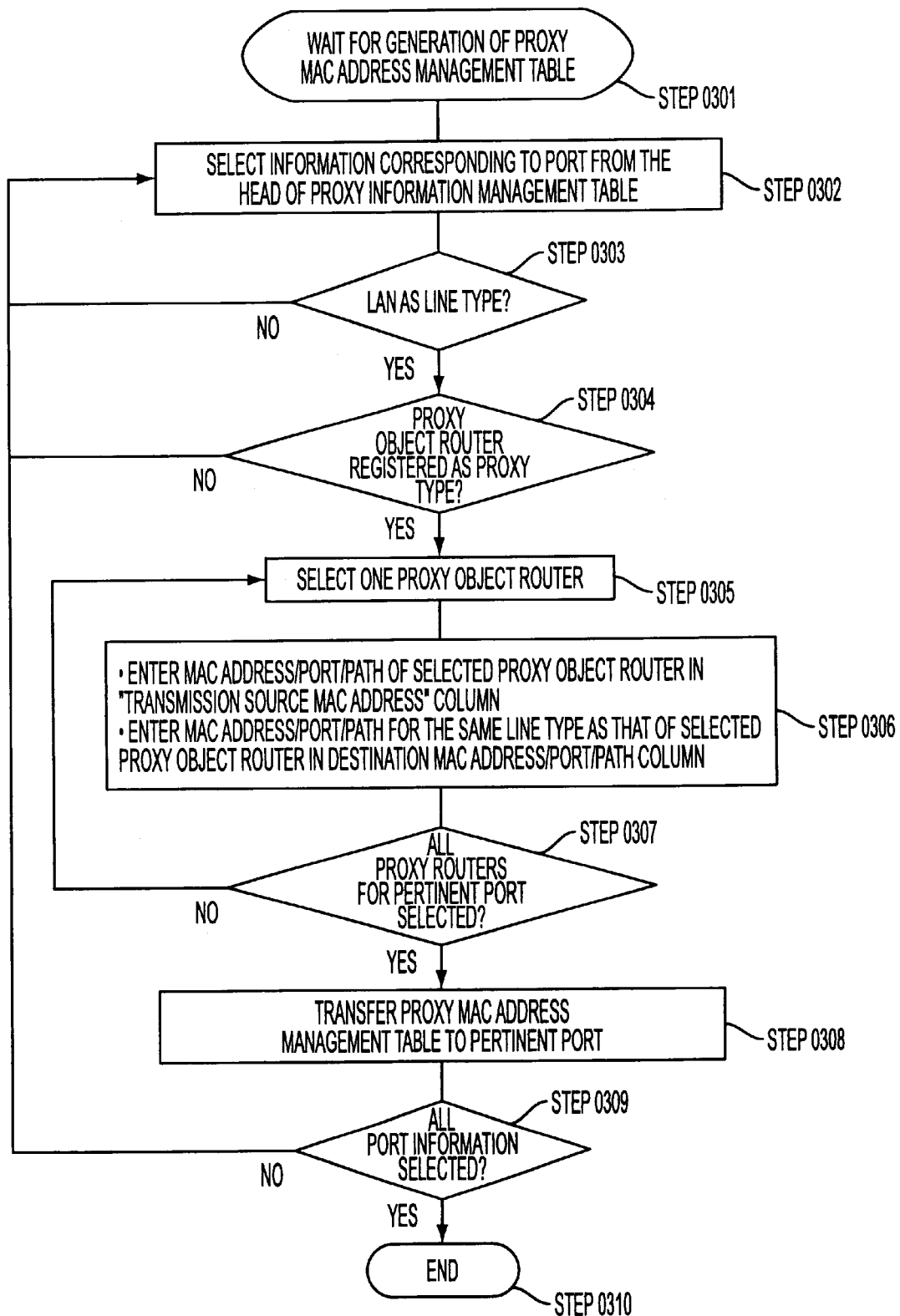
FIG. 16 is a flowchart showing the processing for preparing a proxy MAC address management table stored in the memory of the router in the network shown in FIG. 10.

The proxy MAC address management table is prepared in accordance with the flowchart in FIG. 16. Specifically, processing is suspended while the preparation of the proxy MAC address management table is waited for (STEP 0301), and then information concerning a pertinent port is selected from the head of the proxy information management table (STEP 0302).

A check is performed to determine whether the selected line type is a LAN (STEP 03030). When the line type is a LAN, a check is performed to determine whether a proxy object router is registered as the proxy type for the selected information (STEP 0304).

When a proxy object router is entered in the proxy type column, one proxy object router is selected (STEP 0305). The contents in the "MAC address/port/path" column for the selected proxy object router are entered in the "transmission source MAC address" column. Also, the contents of the "MAC address/port/path" column for the same proxy type as the selected proxy object router are entered in the "input destination MAC address port/path" column (STEP 0306).

The process at STEP 0306 is performed for all the pertinent ports (STEP 0307), and the proxy MAC address management table is transmitted to those ports (STEP 0308). The above described process is performed for all the port information (STEP 0309), and thereafter the proxy MAC address management table, preparation process is terminated (STEP 0310).

Figure 17:
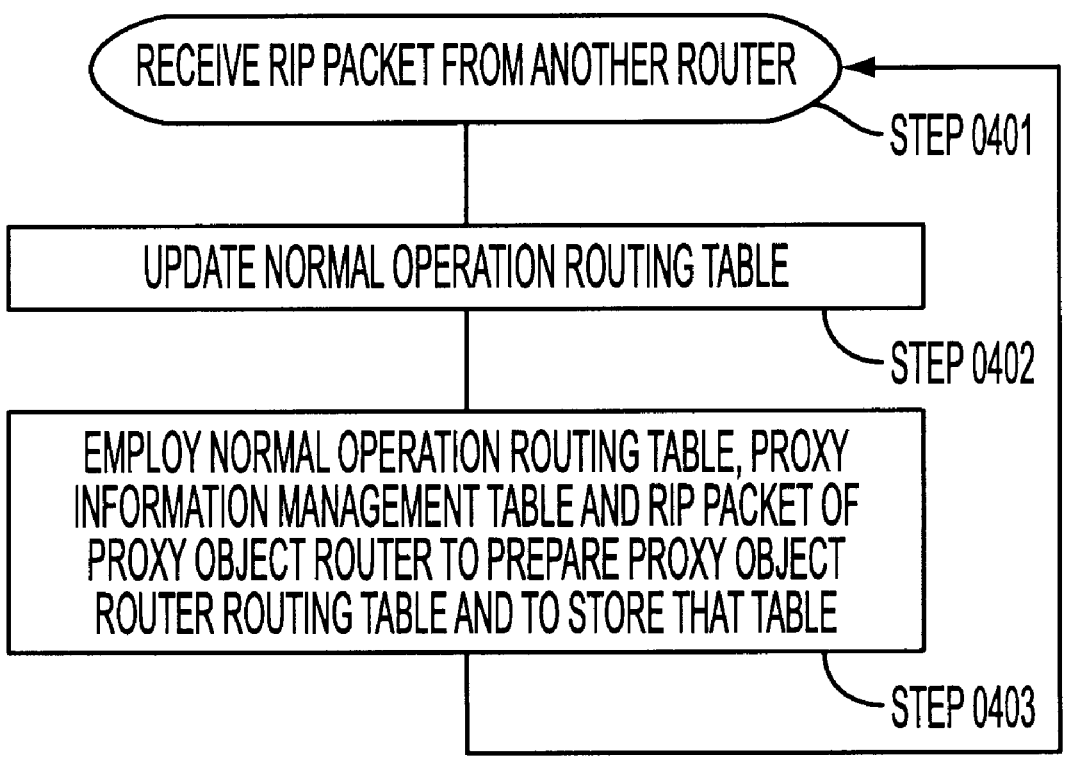
FIG. 17 is a flowchart showing the processing for preparing a routing table stored in the memory of the router in the network shown in FIG. 10.

Then, generally, the router A receives an RIP packet from another router, and based on the packet, prepares the "routing table" shown in FIG. 14D to perform routing. The routing table is prepared in accordance with the flowchart in FIG. 17. That is, an RIP packet from another router is received (STEP 0401), and the routing table for a normal operation is updated (STEP 0402). Then, using the routing table for a normal operation, the proxy information management table and the RIP packet of the proxy object router, a routing table used for a proxy object router is prepared and stored (STEP 0403).

Further, the previously mentioned routing table, the proxy information management table and the RIP packet from the router B in FIG. 14E are used to prepare and store the proxy routing table shown in FIG. 14F. This process corresponds to the process at STEP 0403 in FIG. 17.

Example wherein Router B Malfunctions

The processing performed when router B malfunctions will now be described while referring to the flowchart in FIG. 18. FIG. 19 is a diagram showing the sequence of the operations performed by the routers from the time a specific router malfunctions until a different router begins to function as a proxy.

Figure 18:
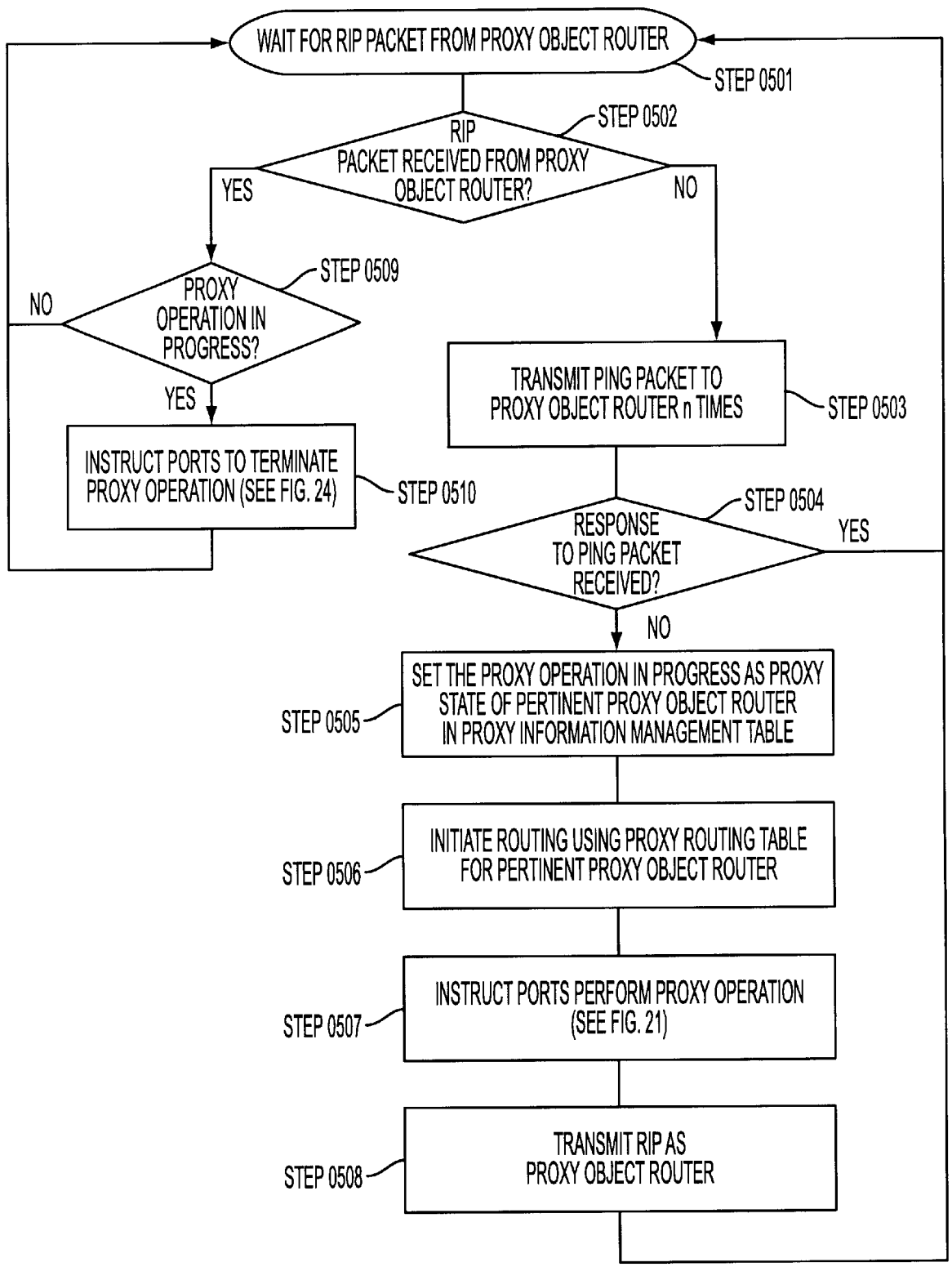
FIG. 18 is a flowchart showing the processing for detecting a fault at a proxy object router in the network shown in FIG. 10, and for detecting the recovery from the fault.
Figure 19:
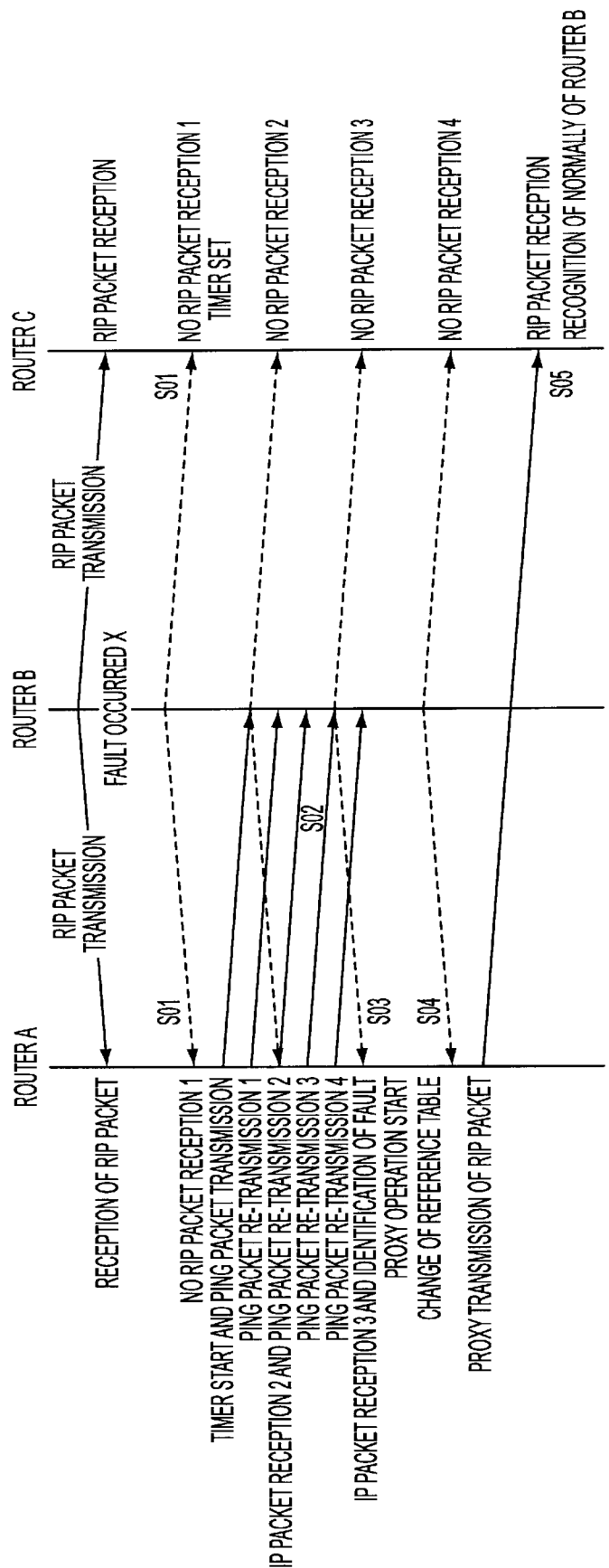
FIG. 19 is a diagram showing the sequence of the operations performed by the routers from the time a fault occurs at a specific router until another router is employed as a proxy.

In FIG. 18, the router A starts an RIP packet waiting timer to set the RIP packet waiting state (STEP 0501). When a fault X occurs at the router B, transmission of RIP packets by the router B is halted (step S01 in FIG. 19) and this halt is detected (STEP 0502). At the same time, PING packets are transmitted to the router B along the proxy line at intervals of 10 seconds until detection of the fault using the RIP packet waiting timer is completed (STEP 0503, step S02).

When no response to the RIP packet is received, the router A confirms that there is a fault at the router B (STEP 0504: step S03), and enters a "." in the proxy state column of the proxy information management table in FIG. 20 (STEP 0505: step S04).

When the router A ascertains that a fault has occurred at the router B, it is prepared to function as a proxy. The router A switches from the routing table for a normal operation to the proxy routing table which is to be referred to, and begins the routing processing (STEP 0506). Then, the router A sends to the port (1) and (2) an instruction to refer to the corresponding proxy MAC address management tables (FIGS. 14B and 14C) (STEP 0507). The details of the processing performed at STEP 0507 are shown in FIG. 21.

Figure 21:
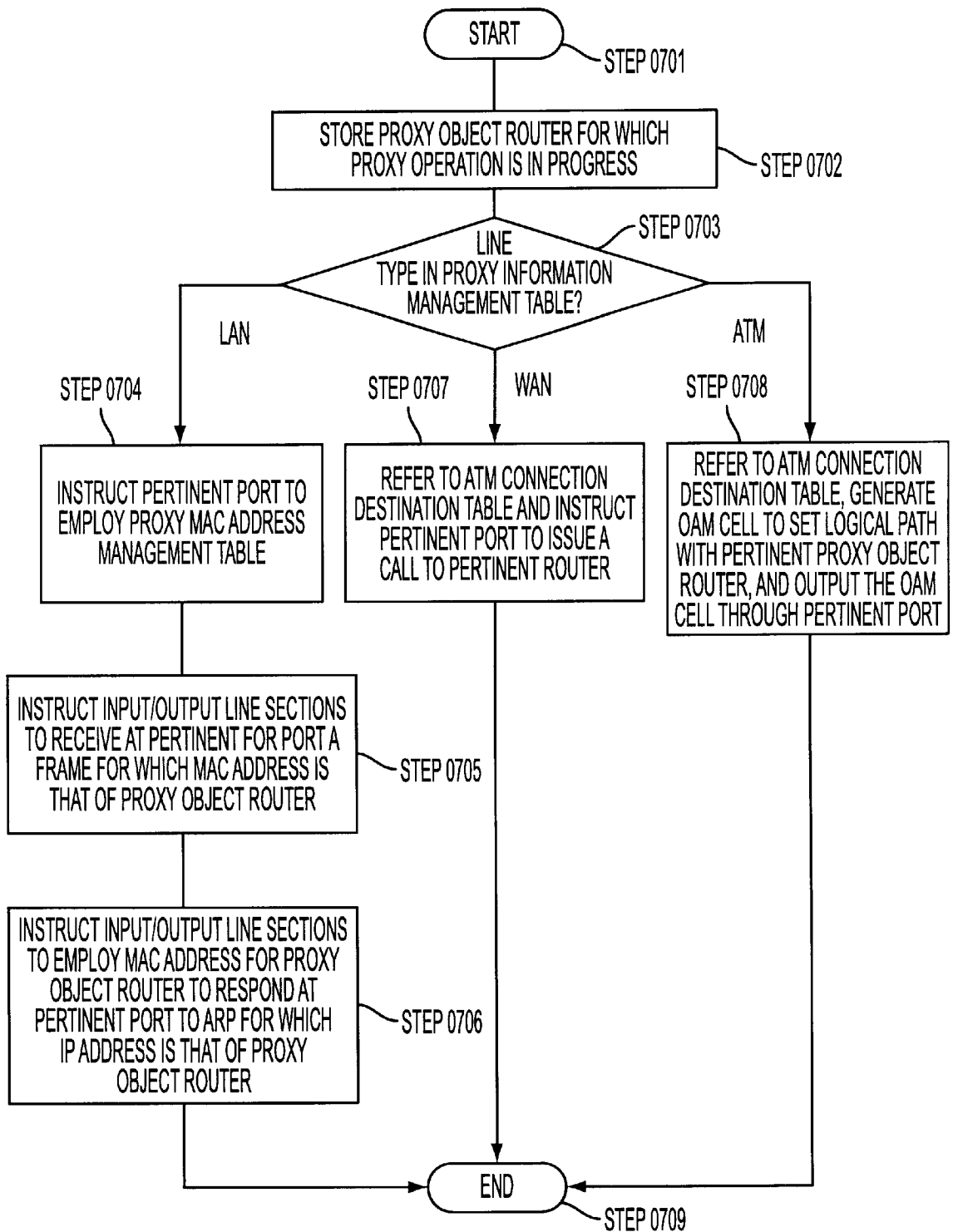
FIG. 21 is a flowchart showing the processing for relaying instructions for a proxy operation to individual ports when a fault occurs at a router B in the network shown in FIG. 10.

When the process shown in FIG. 21 is begun (STEP 0701), a proxy object router for which the proxy operation is being performed is stored (STEP 0702). It is then ascertained that the line type of the proxy information management table in FIG. 20 is a LAN (STEP 0703), and an instruction is issued to a pertinent port (1) or (2) to employ the proxy MAC address management table (STEP 704).

The port (1) or (2) is also instructed to receive a frame for which the destination MAC address is for router B (STEP 0705). Also, the port (1) or (2) is instructed to employ the MAC address of the router to respond to an ARP packet for which the destination IP address is that of the router B (STEP 0706).

Referring again to the flowchart in FIG. 18, instead of the router B, the router A transmits RIP packets to peripheral routers (STEP 0508).

The router C also starts an RIP packet waiting timer when it does not receive an RIP packet from the router B. However, the router A begins to function as a proxy for the router B before the router C has ascertained that a fault has occurred at the router B, and instead of the router B, transmits an RIP packet to the router C. As a result, the router C ascertains that the router B is operating normally (step S05).

Communication between Terminals DTE-b and DTE-d when a Fault Occurs at Router B

An explanation will now be given for communication performed between terminals DTE-b and DTE-d when a fault has occurred at the router B.

Since the terminal DTE-b has not been notified that a fault has occurred at the router B, when the terminal DTE-b initiates the transmission of data to the terminal DTE-d, it transmits the frame shown in FIG. 22A with the router B set as the destination MAC address and the terminal DTE-d set as the destination IP address.

Since the frame with the router B as the MAC address is transmitted to the LAN-II segment, the router A fetches that frame. In addition, since the destination MAC address is for the router B, the router A ascertains that it must perform a proxy operation for the router B. And since the destination IP address is "IIId," the router A refers to the proxy routing table in FIG. 22B (portion III in FIG. 22B), and determines that the frame should be transmitted by the port (2).

Since the router A is operating as a proxy, as is shown in FIG. 22C, the router A refers to the proxy MAC address management table corresponding to the port (2), and sets "$B_M2$" as the transmission source MAC address.

Following this, the frame shown in FIG. 22D is transmitted by the port (2). The terminal DTE-d detects the arrival of the frame, and fetches it after determining that the frame is addressed to it.

An explanation will now be given for a case where the terminal DTE-d transmits a response to the terminal DTE-b. Since the terminal DTE-d has not been notified of the fault at the router B, it transmits the frame shown in FIG. 22E with the router B set as the destination MAC address and the terminal DTE-b set as the destination IP address.

Since a frame with the destination MAC address of the router B arrives at the LAN-III segment, the router A fetches it. Then, since the destination MAC address is that of the router B, the router A ascertains it must act as the proxy for the router B. And since the destination IP address is "IIb," the router A refers to the proxy routing table in FIG. 22F (portion II in FIG. 22F), and determines that the frame should be transmitted by the port (1). Further, since the router A is operating as a proxy, it refers to the proxy MAC address management table in FIG. 22G and sets "$B_M1$" as the transmission MAC address. Thereafter, the frame shown in FIG. 22H is output by the port (1). The terminal DTE-d detects the arrival of the frame, and fetches it after determining that the frame is addressed to it.

Termination of Router a Proxy Function when Router B Recovers

An explanation will be given for the proxy termination process performed by the router A when the router B recovers from the fault. The sequence of the operations performed by the routers A, B and C is shown in FIG. 23.

Figure 23:
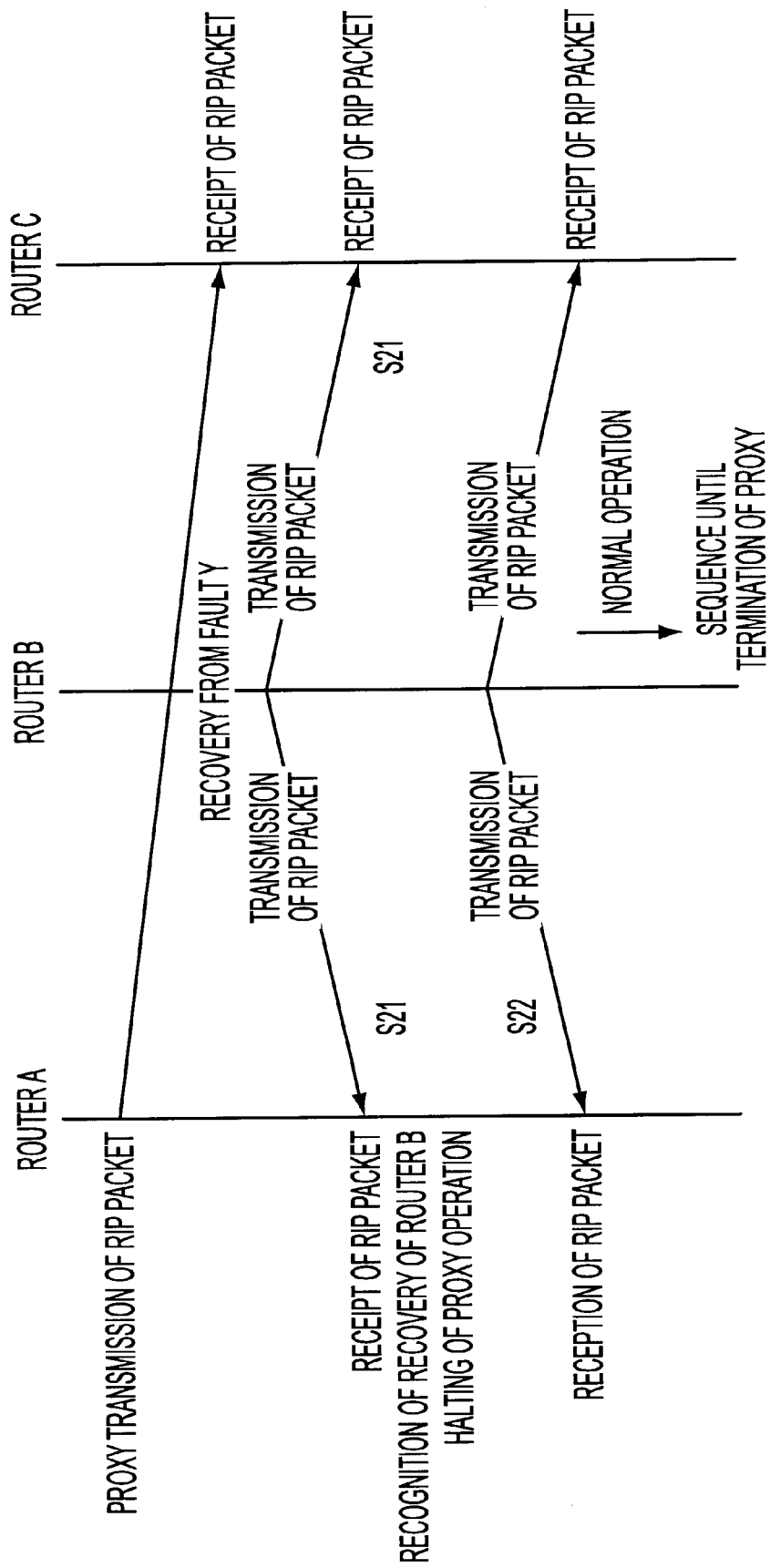
FIG. 23 is a flowchart showing the processing for terminating the operation of the proxy router when the router B in the network shown in FIG. 10 has recovered from the fault.

In FIG. 23, first, when the router B recovers from the fault (Y), it simultaneously transmits RIP packets to the peripheral routers (step S21). Immediately upon receiving the RIP packet, the router A understands that the router B has recovered and halts the proxy operation (step S22). The detailed operation is shown in the flowchart in FIG. 24.

Figure 24:
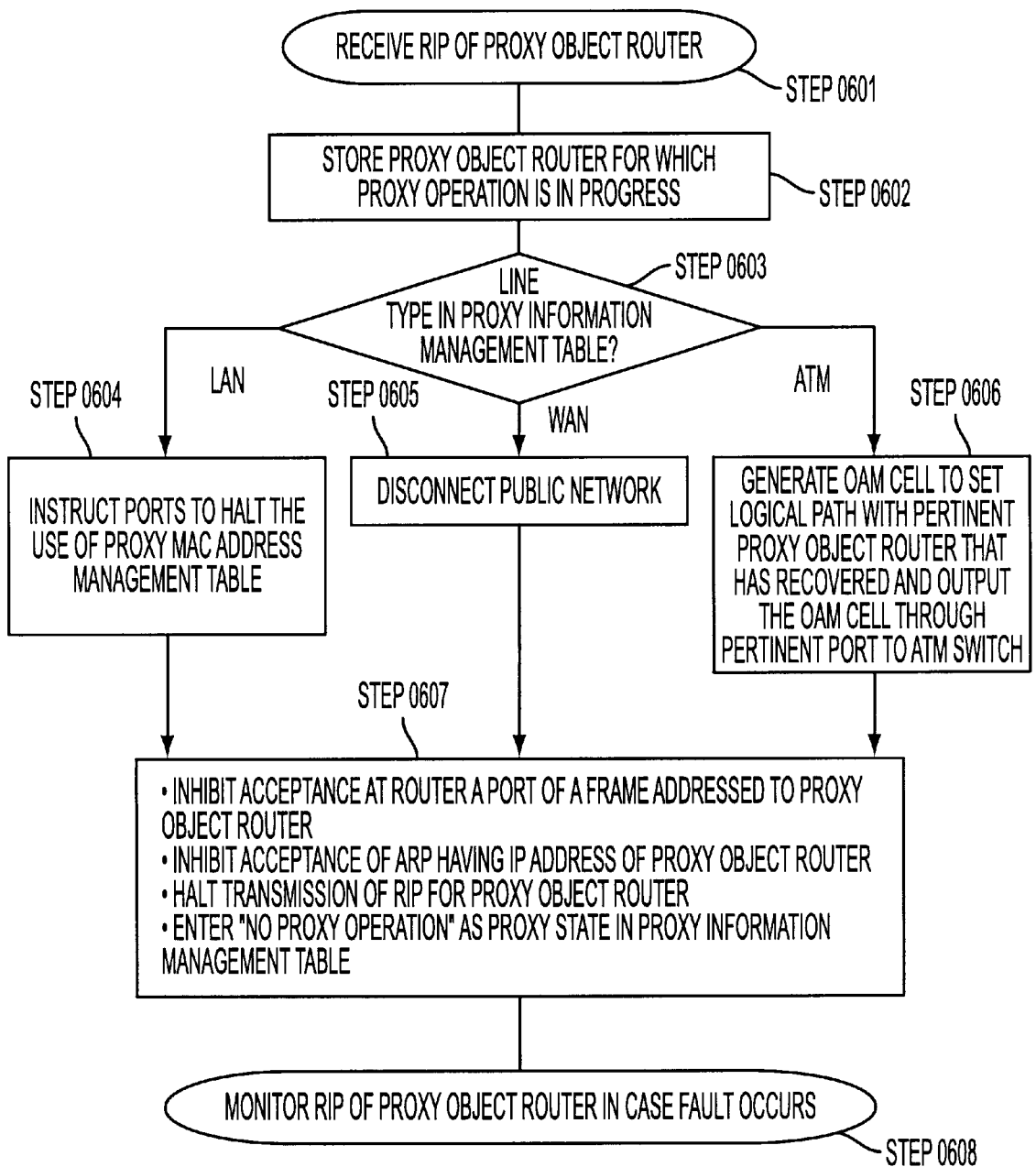
FIG. 24 is a flowchart showing the processing for issuing an instruction to release a proxy operation when the router B in the network shown in FIG. 10 has recovered from the fault.

In FIG. 24, the router A receives an RIP packet from the proxy object router (STEP 0601), stores the pertinent proxy object router (STEP 0602), and examines the line type in the proxy information management table (STEP 0603).

When the line type is a LAN, the router A instructs the pertinent port to halt the use of the proxy MAC address (STEP 0604). Then, the port is controlled so that it will not accept frames addressed to the proxy object router, and also so it will not respond to ARP packets bearing the IP address of the proxy object router.

The transmission of the RIP packets for the proxy object router is also halted, and at the same time the proxy state in the proxy information management table is set to "no proxy operation" (STEP 0607). In addition, continuous monitoring of the RIP packets of the proxy object router is begun to detect a fault were one to occur (STEP 0608).

As a specific example for STEPs 0601 to 0608, the router A instructs the ports (1) and (2) not to accept frames addressed to the router B, and also not to respond to ARP packets bearing the IP address of the router B. The transmission of the RIP packets as a proxy for the router B is also halted, and monitoring of the RIP packets of the router B is begun to detect a fault were one to occur.

Then, the router C receives an RIP packet from the router B, and since information concerning the LAN-V is included in the packet, the router C writes that information into its routing table and continues its normal operation.

When Subordinate Networks for a Proxy Object Router are a LAN and a WAN

An explanation will be given for a case where subordinate networks for a proxy object router are a LAN and a WAN.

Figures 25A, 25B:
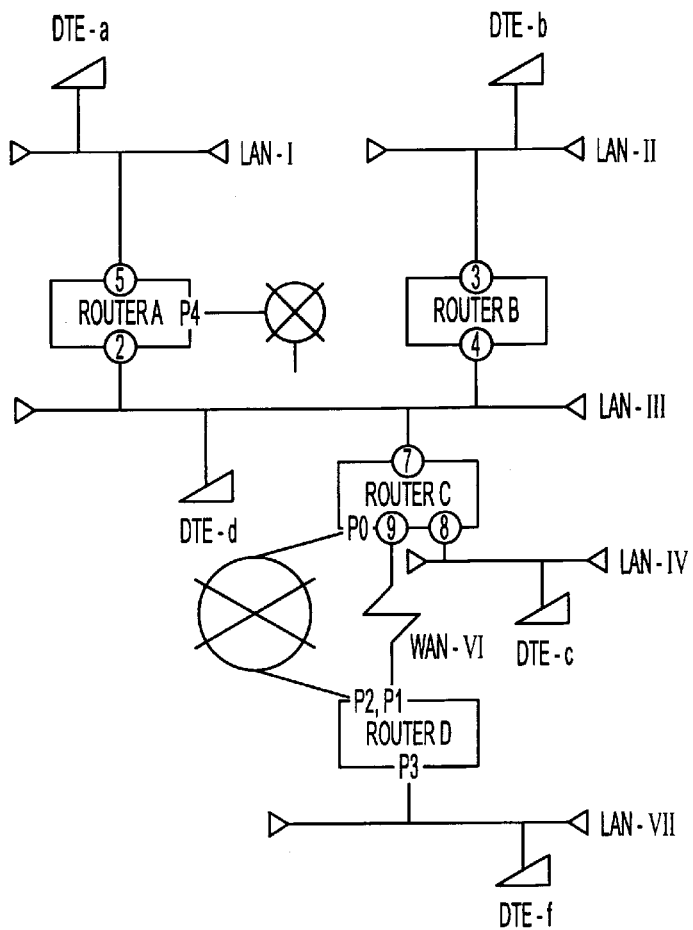
FIG. 25A is a block diagram illustrating an example configuration when the subordinate networks for a proxy object router are a LAN and a WAN.
FIG. 25B is a table showing nodes and corresponding MAC addresses and IP addresses.

The embodiment of the present invention will be described by employing an example wherein, in the LAN-WAN network in FIG. 25A, communication between the terminals DTE-b and DTE-f is begun when a fault occurs at the router C, and the router A begins to function as the proxy for the router C. The MAC addresses and the IP addresses of the individual nodes in the network in FIG. 25A are shown in FIG. 25B.

It should be noted that the terminals DTE-a to DTE-f in the network in FIG. 25 do not have a function for registering more than one gateway, or a function for changing a gateway in response to an ICMP Redirect Message.

The router A includes an ISDN port P1 and an ISDN line which are used when the router is functioning as a proxy. The ISDN line is registered as a backup for an SD line connecting the routers C and D, and in order to use the alternate line, a call must be issued by the router C.

The router A includes the proxy information management table shown in FIG. 26A for functioning as a proxy. Manually entered in this table in advance are proxy object IP addresses, ports used during a proxy operation, and types of connections for a proxy object router. The registration process for the proxy information management table corresponds to the process at STEPs 0101 to 0103 in the previously described flowchart in FIG. 12.

When the line type in the proxy information management table is a WAN, information concerning the WAN is manually registered in advance in the public network connection destination table shown in FIG. 26B (STEP 0104 in FIG. 12).

Operation Performed by Router a Before Fault Occurs at Router C

With the assumptions described and made above, an explanation will be given for the processing performed by the router A before a fault occurs at the router C.

Figure 27A:
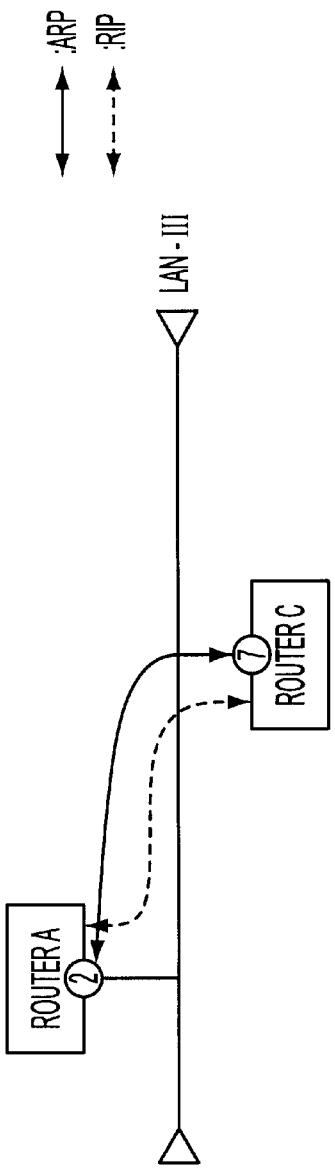
FIGS. 27A and 27B are specific diagrams showing the operation performed before a router A acquires the MAC address for a router C in the network shown in FIG. 25.
Figure 27B:
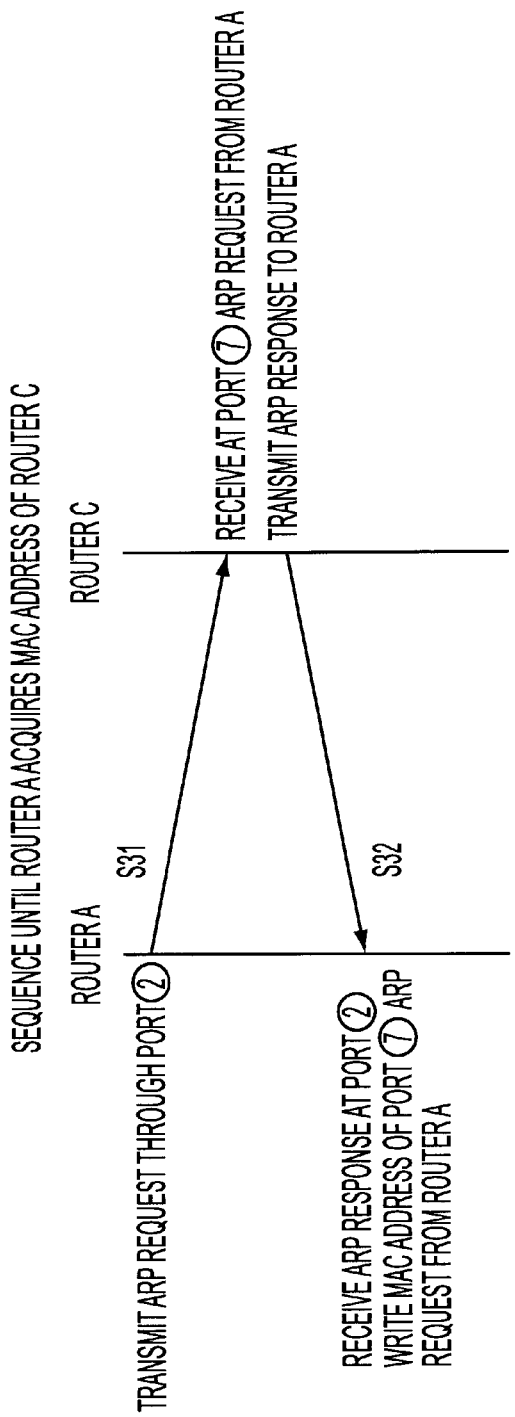

As is shown in the specific diagrams in FIGS. 27A and 27B, in accordance with normal procedures, the router A transmits an ARP packet through the port (2) (step S31), and collects the MAC address information at the port (7) of the router C and writes it into the proxy information management table, as is shown in FIG. 26C (step S32). This process corresponds to the previous process at STEPs 0201 to 0205 in FIG. 15.

During the proxy routing, based on the proxy information management table in FIG. 26A, a proxy MAC address management table in FIG. 26D is prepared to manage an input destination MAC address and a transmission source MAC address, which is added to data to be output. The proxy MAC address management table is then transferred to the individual ports and stored thereat. This process corresponds to the previously mentioned process at STEPs 0301 to 0310 in FIG. 16.

During a normal operation, the router A receives RIP packets from other routers, prepares the routing table in FIG. 26F based on the received information, and performs routing in accordance with the table. This processing corresponds to that at STEPs 0401 to 0402 in FIG. 17.

The "normal operation routing table" in FIG. 26E, the "proxy information management table" in FIG. 26C, and the "RIP packet from the router C" in FIG. 26F are employed to prepare the proxy routing table in FIG. 26G, which is thereafter stored. This process corresponds to that at STEP 0403 in FIG. 17.

When a Fault Occurs at Router C

Figure 28:
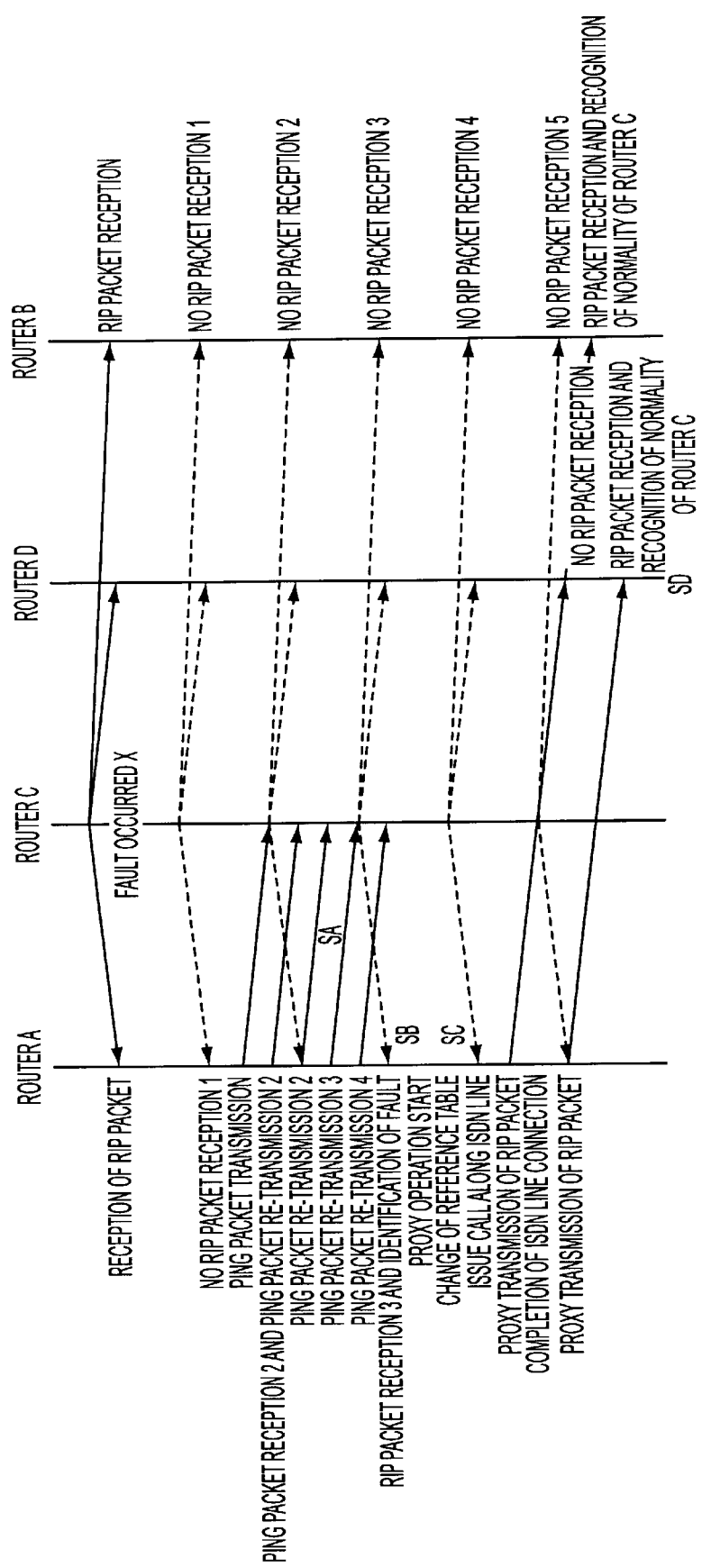
FIG. 28 is a diagram showing the sequence of the operations performed by the individual routers in the network shown in FIG. 25 from the time a fault occurs at a router C until another router begins to act as a proxy.

An explanation will now be given for a case wherein a fault occurs at router C in the network in FIG. 25A. FIG. 28 is a diagram showing the sequence of the operations performed by the routers from the time it is confirmed that a fault has occurred at the router C until the proxy operation is initiated.

When a fault X occurs at the router C, transmission of RIP packets from the router C to the router A is halted. The RIP packet waiting timer is started, and at the same time PING packets are transmitted by the port (2) to the router C at intervals of 10 seconds until the detection of a fault by the RIP packet waiting timer is completed (step SA). When the occurrence of a fault at the router C is confirmed (step SB), "." is entered into the proxy state column of the proxy information management table in FIG. 29 (arrow *1 in FIG. 29). This process corresponds to the previously described processing at STEPs 0501 to 0505 in FIG. 18.

When the router A ascertains a fault has occurred at the router C, it is prepared to begin to function as a proxy. The routing table for a normal operation is switched to the proxy routing table which is to be referred to, and the routing is initiated (step SC). This processing corresponds to that at STEP 0506 in FIG. 18.

Then, the router A issues an instruction to the port (2) to also refer to the proxy MAC address management table. This process corresponds to that at STEPs 0701 to 0704 in FIG. 21. In addition, an instruction is issued to the port (2) to receive a frame which has the destination MAC address of the router C (STEP 0705 in FIG. 21).

An additional instruction is issued to the port (2) to employ the MAC address of the router C to respond to the ARP packet which had the destination IP address of the router C (STEP 0706 in FIG. 21).

The router A transmits an instruction to the port P4 to issue a call to the port P2 of the router D to establish a connection via an ISDN line (STEP 0707 in FIG. 21).

The router A, functioning as the proxy for the router C, transmits to the peripheral routers RIP packets for the router C (STEP 0508 in FIG. 18).

The router D initiates the RIP packet waiting timer when it does not receive an RIP packet from the router C. However, since the router A begins to function as the proxy for the router C before the router D ascertains a fault has occurred at the router C, when the routers A and D are connected via the ISDN line, the router A transmits to the router D an RIP packet for the router C. As a result, the router D assumes that the router C is operating normally and has simply switched over to the alternate ISDN line (step SD in FIG. 28). Then, the router D employs the designated port P2 used for the fault.

The router B also initiates the RIP packet waiting timer when it does not receive an RIP packet from the router C. However, since the router A begins to function as the proxy for the router C before the router B ascertains a fault has occurred at the router C, the router A transmits to the router B an RIP packet for the router C. As a result, the router B assumes that the router C is operating normally (step SE in FIG. 28).

Communication between Terminals DTE-b and DTE-f when a Fault has Occurred at Router C An explanation will now be given for the communication performed between terminals DTE-b and DTE-f when a fault occurs at the router C in the network in FIG. 25A.

Figure 47:
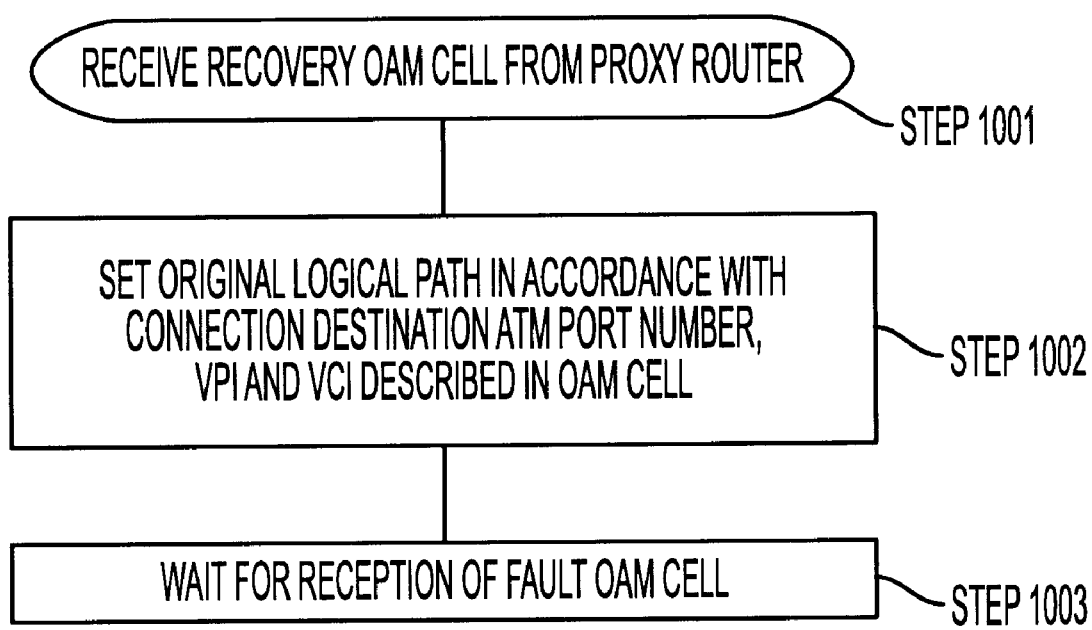
FIG. 47 is a flowchart for the path switching processing performed by the ATM switch shown in FIG. 32 when a fault is eliminated.

For the transmission of data from the terminal DTE-b to a terminal DTE in a network other than the LAN-II, the terminal DTE-b sets as the destination MAC address, that of the router B, and as the destination IP address, that of the terminal DTE-f, and transmits the frame in FIG. 47. In this manner, the terminal DTE-b initiates the transmission of data to the terminal DTE-f.

Since a frame for which the MAC address is that of the router B arrives at the router B, it is employed to fetch data and to perform routing. However, since the router B is not notified that a fault has occurred at the router C, the router B sets as the MAC address the address of the router C, and transmits the frame in FIG. 30B to the router C.

Since the frame for which the MAC address is that of the router C arrives at the LAN III, the router A fetches the frame. Since the destination MAC address is for the router C, the router A assumes that it must act as the proxy for the router C. And since the destination IP address is "VIIf," the router A refers to a proxy routing table in FIG. 30C and determines which frame should be transmitted through the port P4.

In accordance with this determination, the router A transmits a frame through the port P4. Since at this time the connection with the WAN has been established, the router A employs a PPP (Point-to-Point Protocol) frame format for data transmission. The information field (IP packet) for this format is shown in FIG. 30D.

The router D receives a frame by being connected to the WAN. Since the destination of the frame is the terminal DTE-f, which is connected to the subordinate LAN-II of the router D, the destination MAC address and the destination IP address which are set is that of the terminal DTE-f, and the frame in FIG. 30E is transmitted. The terminal DTE-f fetches the frame which is addressed to An explanation will be given for a case wherein the terminal DTE-f transmits a response to the terminal DTE-b. Since the terminal DTE-f is transmitting data to a terminal DTE in a different network from the LAN-VII, the terminal DTE-f sets as the destination MAC address, that of the router D, and as the destination IP address, that of the DTE-b, and transmits the frame in FIG. 30F.

The router D fetches a frame for which the MAC address is its own. Further, since the destination is for an external network, the router D is to transmit it to the router C. However, since the router D has been notified that the router A is functioning as a proxy and that an alternate route is currently being used, the router D employs the port 2 for the transmission. Since the connection in this case is established at the WAN, the PPP frame format is employed for the transmission of data. The information field (IP packet) in the frame to be transmitted is shown in FIG. 30G.

Since the router A receives a frame at the port (4), the router A ascertains that the proxy operation is required for the router C. And since the IP address is "IIb," the router A refers to the proxy routing table in FIG. 30H (portion II in FIG. 30) and determines that a frame should be transmitted through the port (2).

Furthermore, since the router A is acting as a proxy, the router A refers to the proxy MAC address management table in FIG. 30I, which corresponds to the port (2), and enters "$C_M1$" as the transmission source MAC address. Then, the router A transmits the frame in FIG. 30J through the port (2).

Since the destination DTE-b of the received frame is a terminal DTE which is connected to the subordinate LAN-II of the router B, the router B transmits the frame in FIG. 30K, while setting both as the destination address of the MAC header and as the destination address of the IP header, that of the DTE-b.

The terminal DTE-b fetches a frame that is addressed to it. In this manner, when a fault has occurred at the router C, communication between the terminals DTE-b and DTE-f is enabled.

Proxy Termination Performed by Router a when Router C Recovers from a Fault

Figure 31:
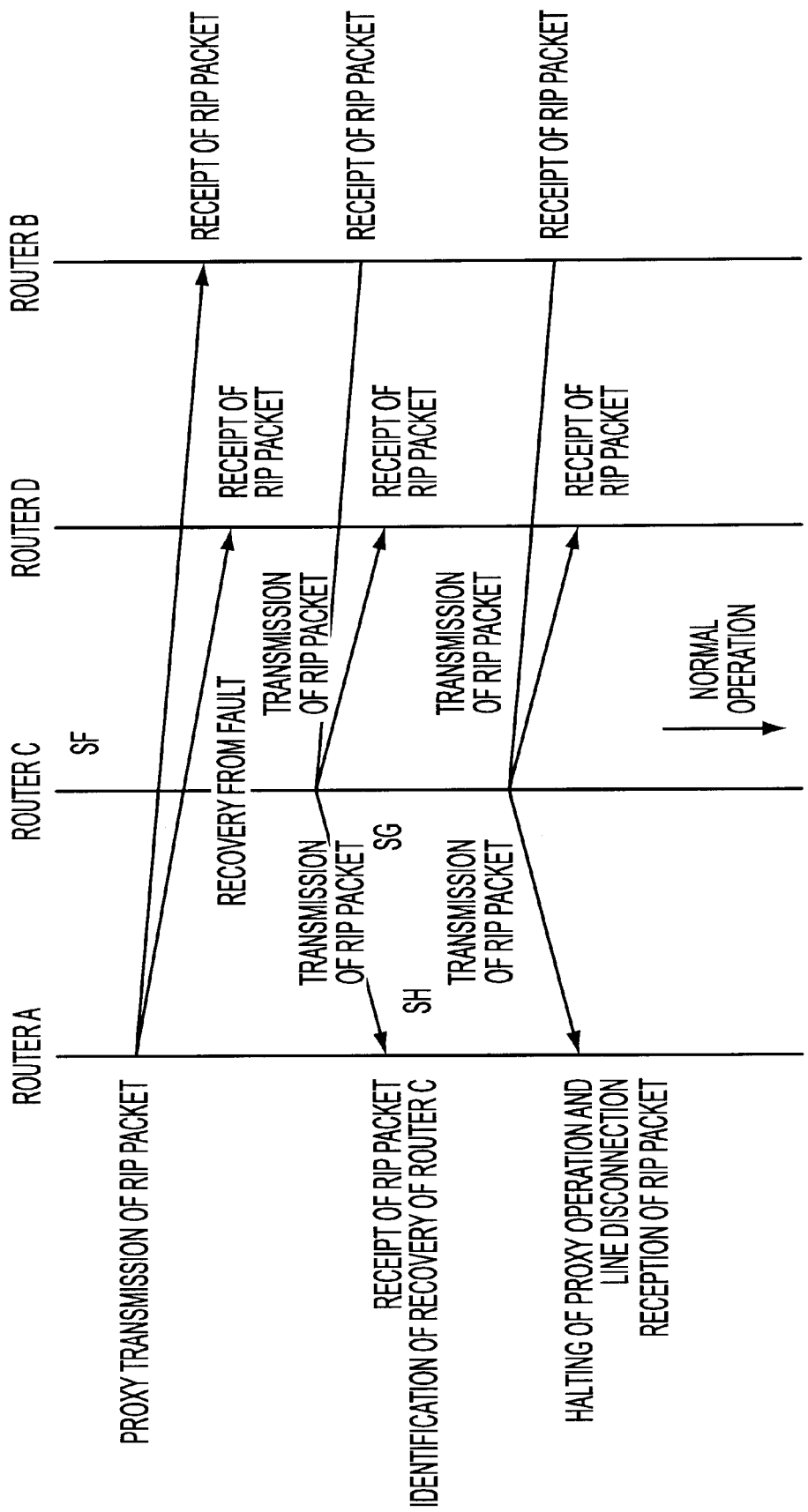
FIG. 31 is a diagram showing the sequence of the operations performed by the routers in the network shown in FIG. 25 from the time the router C recovers from the fault until the role of the proxy is ended.

An explanation will now be given for the operation for terminating the proxy operation of the router A when the router C recovers from a fault. The sequence of the operations performed by the routers is shown in FIG. 31.

When the router C recovers from the fault (step Sf), it simultaneously transmits RIP packets to the peripheral routers (SG). Upon receiving the RIP packet from the router C, the router A immediately ascertains that the router C has recovered (step SH) and halts the proxy operation. This process corresponds to STEPs 0601 to 0605, and 0607 and 0608 in FIG. 24.

First, the router C issues instructions to the port P4 to disconnect the ISDN line, and to the port (2) to not accept frames addressed to the router C.

Also, the port (2) is instructed not to respond to ARP packets for which the IP address is that of the router C.

The router A also halts the transmission of RIP packets as the proxy for the router C, and begins to monitor of the RIP packets of the router C to detect a fault were one to occur.

The router B also receives an RIP packet from the router C, writes the information into its routing table, and continues its normal operation. The router D also receives an RIP packet from the router C along the SD line, assumes that the SD line is active since the ISDN line has been disconnected, and continues its normal operation.

When Subordinate Networks of a Proxy Object Router are a LAN and a WAN

An explanation will be given for a case wherein, in the LAN and ATM networks shown in FIG. 32, terminals DTE-b and DTE-d communicate with each other when a fault occurs at the router B and the router A is functioning as the proxy for the router B.

Figure 32:
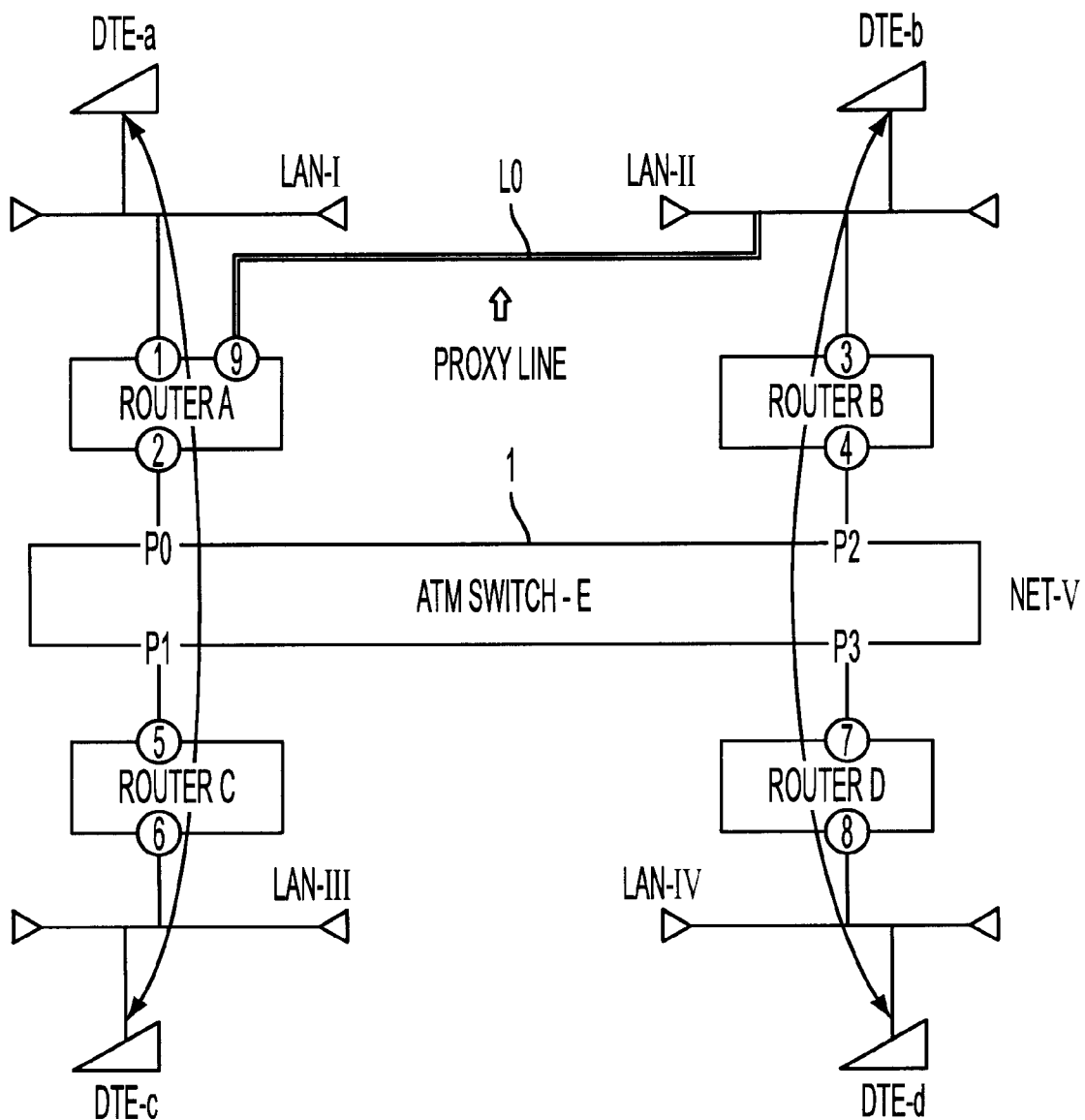
FIG. 32 is a block diagram illustrating an example configuration for a network constituted by LANs and an ATM.

The MAC addresses and the IP addresses of the nodes in the network in FIG. 32 are shown in FIG. 33A, and connection ports for communication intervals between the terminals, and VPIs and VCIs for the connection sources and the connection destinations of the ATM switch (E) 1 are shown in FIG. 33B.

The following assumptions are made. The terminals DTE-a to DTE-d in the network in FIG. 32 do not have a function for registering more than one gateway or a function for changing a gateway in response to an ICMP Redirect Message. The router A includes a proxy information management table in FIG. 34 for functioning as a proxy, and manually entered in the table in advance are proxy object IP addresses, ports used when functioning as a proxy, and connection types with proxy object routers. The registration procedures for the proxy information management table correspond to those at STEPs 0101 to 0103 in FIG. 12, which were previously described.

When the line type in the proxy information management table is "ATM," at STEP 0105 in FIG. 12 the information concerning the ATM is manually registered in advance in an ATM connection destination table in FIG. 35. Further, the proxy port is used for reception but not used for transmission (excluding the transmission of an ARP packet).

Operation Performed by Router a Before a Fault Occurs at Router B

Figure 36A:
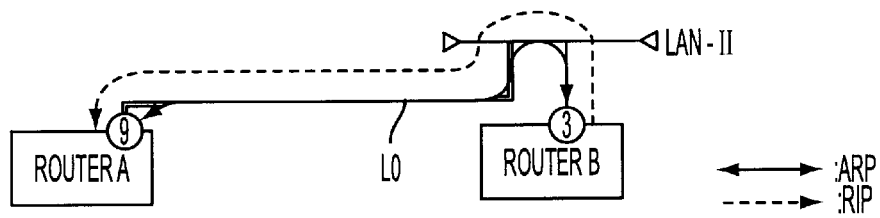
FIGS. 36A and 36B are specific diagrams showing the operations performed before the router A acquires the MAC address for the router B.
Figure 36B:
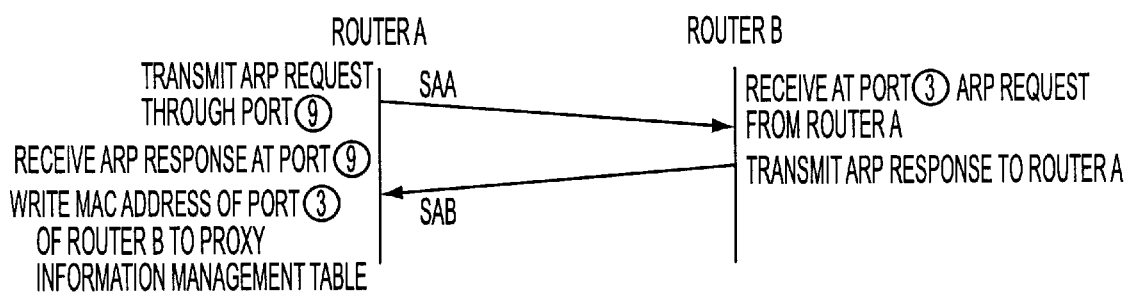

With the assumptions described and made above, an explanation will be given for the operation performed by the router A before a fault occurs at the router B. The sequence of the operations performed before the router A acquires the MAC address of the router B is shown in FIGS. 36A and 36B. In FIG. 36A is specifically shown the relationship between the routers A and B, and in FIG. 36B is shown the sequence of the operations performed by the routers A and B.

The router A transmits an ARP packet through the proxy line L0 (step SAA), and collects MAC address information for the port (3) of the router B (step SAB). The router A then writes the MAC address for the port (3) into a location corresponding to the port (9) in the proxy information management table, as is shown in FIG. 37A (arrow *1 in FIG. 37A).

At this time, the router A performs an ARP transmission using the MAC address ($A_M2$) of the port (9) and the IP address (IIA) assigned to the LAN-II. However, since the proxy type in the proxy information management table in FIG. 37A is "temporary," the router A does not respond to a frame for which the MAC address is that of the router A, except for the return to ARP of the router A. This processing corresponds to the processing at STEPs 0201 to 0205 in FIG. 15.

The proxy information management table in FIG. 37A is employed to prepare a proxy MAC address management table (FIG. 37B) for managing input destination MAC addresses and transmission source MAC addresses provided for data before it is output. The obtained table is transferred to the port (9) and stored therein. This processing corresponds to the processing at STEPs 0301 to 0310 in FIG. 16.

During a normal operation, the router A receives an RIP packet from another router, prepares the routing table in FIG. 37C and performs routing in accordance with the table. This processing corresponds to the processing at STEPs 0401 and 0402 in FIG. 17.

The proxy information table (FIG. 37A), the normal operation routing table (FIG. 37C), and the latest RIP packet from the router B (FIG. 37D) are employed to prepare the proxy routing table in FIG. 37E, which is stored in the router A. This process corresponds to the process at STEP 0403 in FIG. 17.

Figure 38:
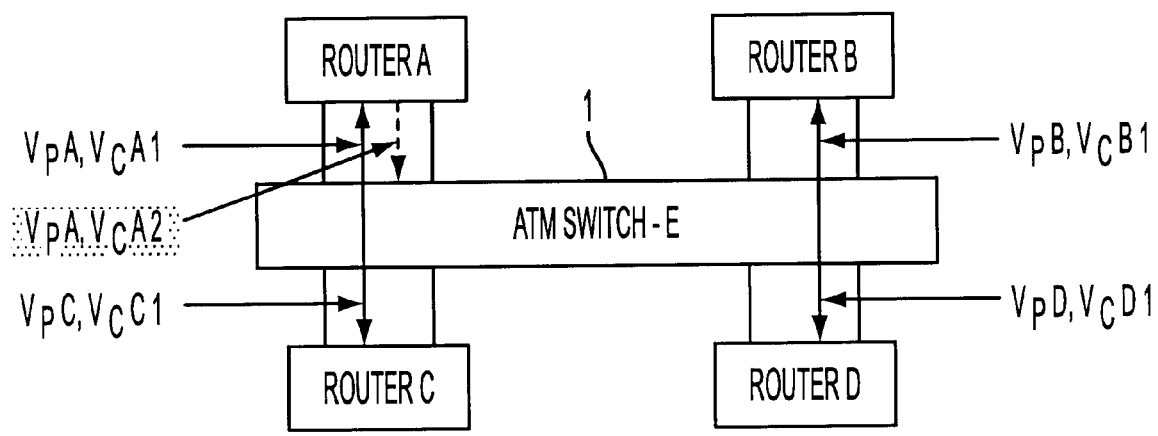
FIG. 38 is a diagram showing "$V_PA$" and "$V_CA2$," extending from the ATM switch (E) 1 to the router A, which are set as logical paths VPI and VCI and are employed when the router A acts as a proxy.

As is shown in FIG. 38, the logical path, with VPI as "$V_PA$" and VCI as "$V_CA2$," is formed between the ATM switch (E) 1 and the router A for use for a proxy operation. The ATM switch (E) 1 switches the logical paths based on the logical path management table in FIG. 37F.

Operation when a Fault Occurs at Router B

Figure 39:
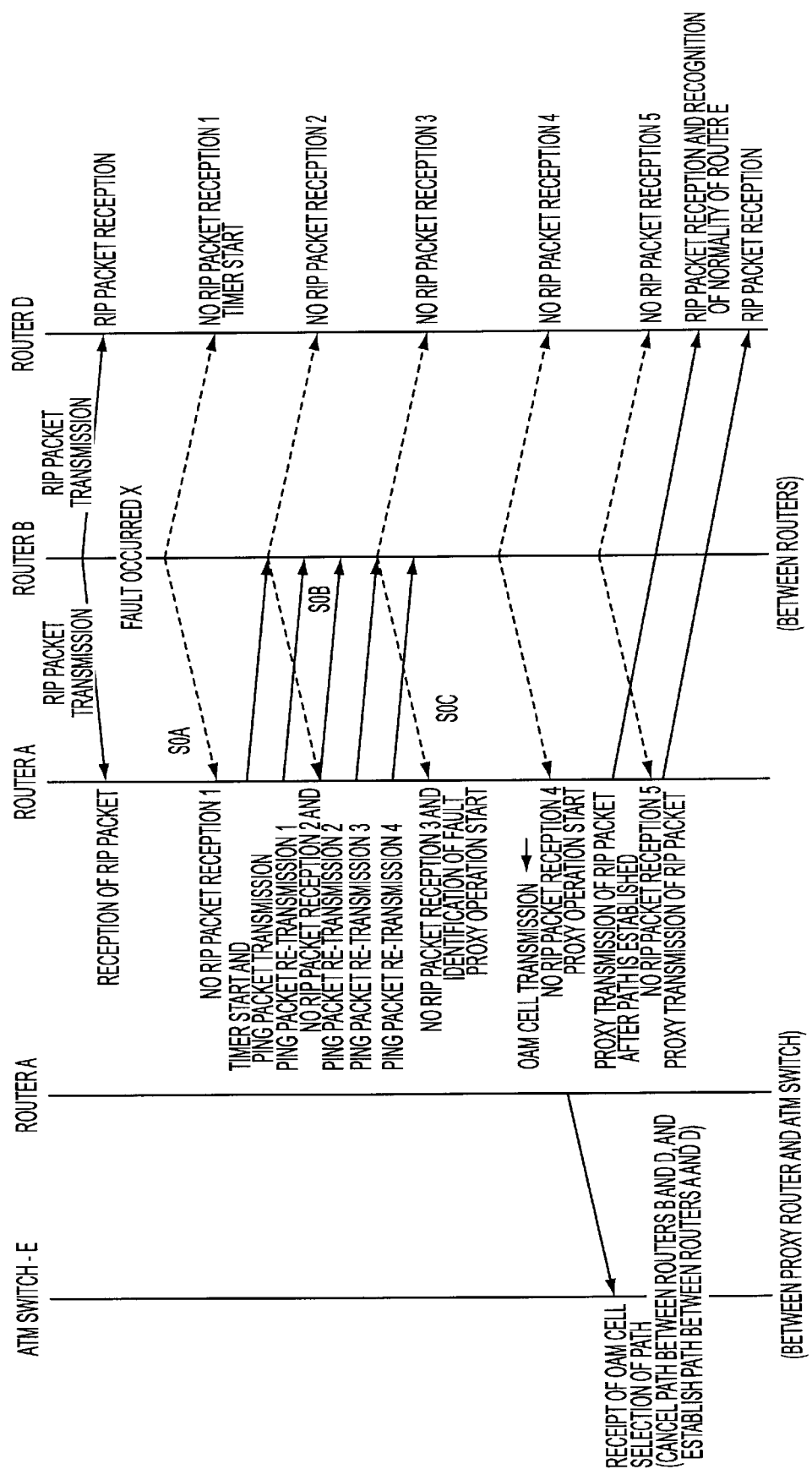
FIG. 39 is a diagram showing the sequence of the operations performed by the routers in FIG. 32 from the time a fault occurs at a specific router until another router begins to act as a proxy.

The operation performed when a fault occurs at the router B will now be described. The sequence of the operations which are performed is shown in FIG. 39. When a fault X occurs at the router B, transmission of the RIP packets from the router B to the router A is halted (step S0A). As a result, the router A starts the RIP packet waiting timer, and also transmits PING packets to the router B along the proxy line at intervals of 10 seconds until the detection of a fault using the RIP packet waiting timer is completed (step S0B).

Since there no response to the PING packets is received, the router A ascertains that the router B has malfunctioned (step S0C), and places a "." in the proxy state column of the proxy information management table in FIG. 40 (arrows *1 and *2 in FIG. 40). This processing corresponds to that at STEPs 0501 to 0505 in FIG. 18.

When the router A ascertains that a fault has occurred at the router B, it is prepared begin functioning as a proxy. The router A switches from the normal operation routing table to the proxy routing table which is to be referred to, and initiates the routing. This process corresponds to that at STEP 0506 in FIG. 18.

The router A instructs the port (9) to also refer to the proxy MAC address management table. This process corresponds to that at STEPs 0701 to 0704 in FIG. 21.

Furthermore, the router A instructs the port (9) to receive frames for which the MAC address is that of the router B. This process corresponds to the process at STEP 0705 in FIG. 21.

In addition, the router A instructs the port (9) to employ the MAC address of the router B to respond to an ARP packet for which the IP address is that of the router B. This process corresponds to that at STEP 0705 in FIG. 21.

Along the logical path ($V_PA$, $V_CA2$) which is used for the proxy operation, the router A transmits to the ATM switch (E) 1 an OAM cell which includes a connection destination ATM port and connection destinations VPI and VCI, so that the ATM switch (E) 1 will switch the logical paths (step S0D). This process corresponds to the process at STEP 0708 in FIG. 21.

Figure 41:
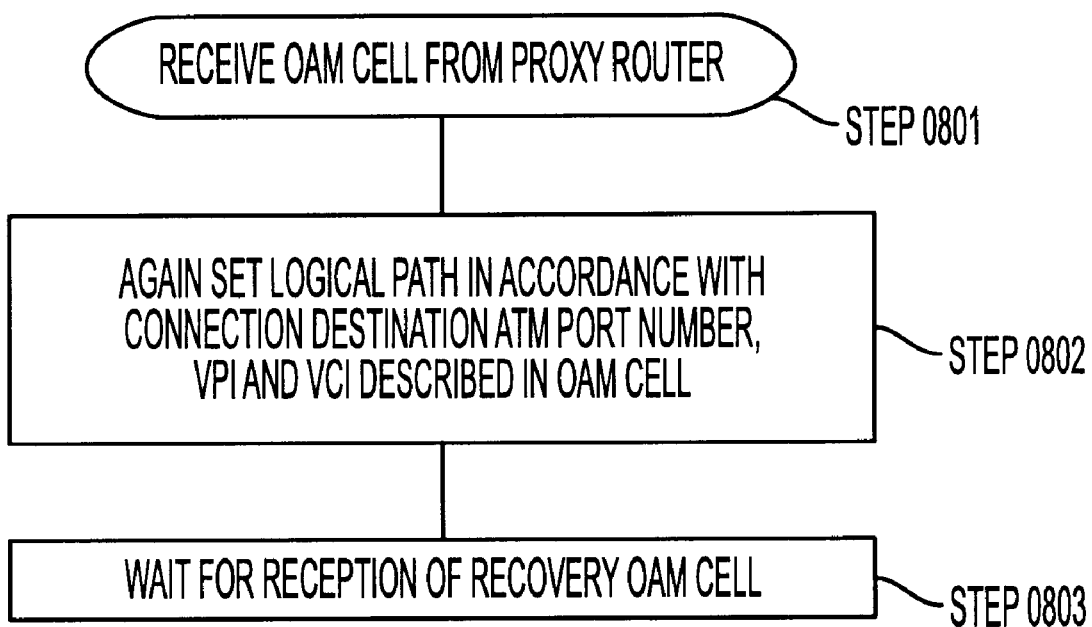
FIG. 41 is a flowchart showing the path switching processing performed by the ATM switch shown in FIG. 32.

As in the flowchart in FIG. 41, the ATM switch (E) 1 receives the OAM cell (STEP 0801). The ATM switch (E) 1 additionally enters, in a logical path management table in FIG. 42, a logical path, with a VPI of "$V_PA$" and a VCI of "$V_CA2$," along which the OAM cell is received, and a logical path, which is described in the OAM cell, for connecting the logical path with the VPI of "$V_PD$" and the VCI of "$V_CD1$" to the port P3 of the ATM switch (E) 1, and sets the use state as "." (arrow *1 in FIG. 42) (STEP 0802).

In addition, the use state of the logical path along which a fault has occurred is set to "X" (arrow *2 in FIG. 42). The ATM switch (E) 1 hereinafter switches the logical path in accordance with the rewritten contents of the table (STEP 0803).

The router D also starts the RIP packet waiting timer when reception of the RIP packets from the router B is halted. The router D might assume that a fault has occurred at the router B because no RIP packets arrive; however, since the router A is functioning as the proxy for the router B and transmits an RIP packet to the router D when the ATM switch (E) 1 switches the logical paths, the router D assumes that the router B is operating normally. This processing corresponds to that at STEP 0508 in FIG. 18.

Figure 43:
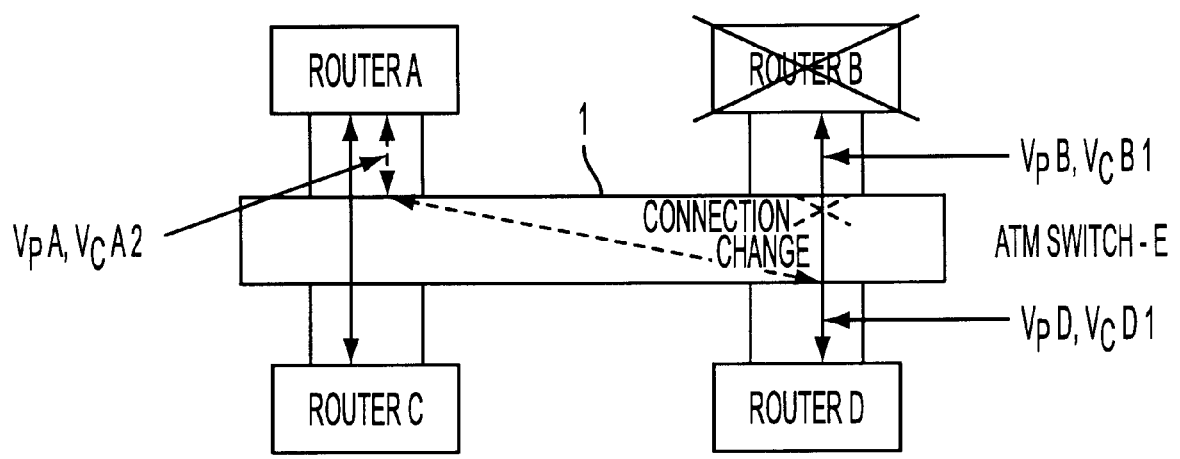
FIG. 43 is a diagram showing the state that exists when the paths are switched by the ATM switch in FIG. 32.

FIG. 43 is a diagram showing the condition where, since it has been ascertained that a fault has occurred at the router B, the ATM switch (E) 1 switches the connection from the router B to the router A.

Communication between Terminals DTE-b and DTE-d when a Fault Occurs at Router B

An explanation will be given for another example of the communication between terminals DTE-b and DTE-d in the network in FIG. 32 when a fault occurs at the router B.

In the transmission of data from the terminal DTE-b to the terminal DTE-d, since the terminal DTE-b is not notified that a fault has occurred at the router B, it transmits the frame in FIG. 44A, while setting as the destination MAC address, that of the router B,and as the destination IP address, that of the terminal DTE-d.

When the frame for which the MAC address is that of the router B is transmitted to the LAN-II, the router A fetches this frame. Since the MAC address is that of the router B, the router A determines it must function as the proxy for the router B. And since the destination IP address is "IVd," the router A refers to the proxy routing table in FIG. 44B and determines from III in the table that the frame should be transmitted through the port (2).

The received frame is transmitted through the port (2) and along the logical path with the VPI of "$V_PA$" and the VCI of "$V_CA2$." Since the ATM connection is employed at this time, the frame is changed to an ATM cell before being transmitted. The IP frame which is to be formed as a cell is shown in FIG. 44C.

The ATM switch (E) 1 refers to a logical path management table in FIG. 44D (arrow *1), selects the logical path along which the VPI of the port P3 is "$V_PD$" and the VCI," is "$V_CD1$," and outputs the received cell along this logical path.

The router D receives the ATM cell via the logical path for which the VPI of the port (7) is "$V_PD$" and the VCI is "$V_CD1$," and assembles the IP frame from the ATM cell.

Since the destination of the obtained IP frame is the terminal DTE-d which is connected to the subordinate LAN-IV of the router D, the destination address of the MAC header is set as the terminal DTE-d and the frame in FIG. 44E is output to the terminal DTE-d. The terminal DTE-d receives the frame which is addressed to it.

An explanation will now be given for an example where the terminal DTE-d transmits a response to the terminal DTE-b. Since the terminal DTE-d is not notified of the occurrence of the fault at the router B, it sets as the destination MAC address, that of the router B, and as the destination IP address, that of the DTE-b, and transmits the frame in FIG. 44F.

The router D fetches the frame for which the MAC address is its own. Since the destination IP address is in the direction of the LAN-II, the router D determines that the frame must be transmitted to the router B, and transmits the frame in FIG. 44G along the logical path for which the VPI of the port P3 is "$V_PA$" and the VCI is "$V_CA2$."

The ATM switch (E) 1 refers to the logical path management table in FIG. 44H (arrow *1), selects the logical path for which the VPI of the port P3 is "$V_PA$" and the VCI is "$V_CA2$" and outputs the received cell along the logical path.

The router A receives the ATM cell along the logical path for which the VPI of the port (2) is "$V_PA$" and the VCI is "$V_CA2$" and assembles the IP frame. Since this cell frame is received along the proxy path, the router A assumes that it must function as the proxy for the router B. Further, since the IP address is "IIb," the router A refers to the proxy routing table in FIG. 45A (portion II) and determines that the frame should be transmitted through the port (9).

Furthermore, since the router A is functioning as a proxy, it refers to the proxy MAC address management table in FIG. 44B, sets the transmission source MAC address to "$B_M$," and outputs the frame in FIG. 44C through the port (9). The terminal DTE-b, upon receiving the frame addressed to itself, fetches that frame.

Proxy Termination of Router A when Router B Recovers from a Fault

Figure 46:
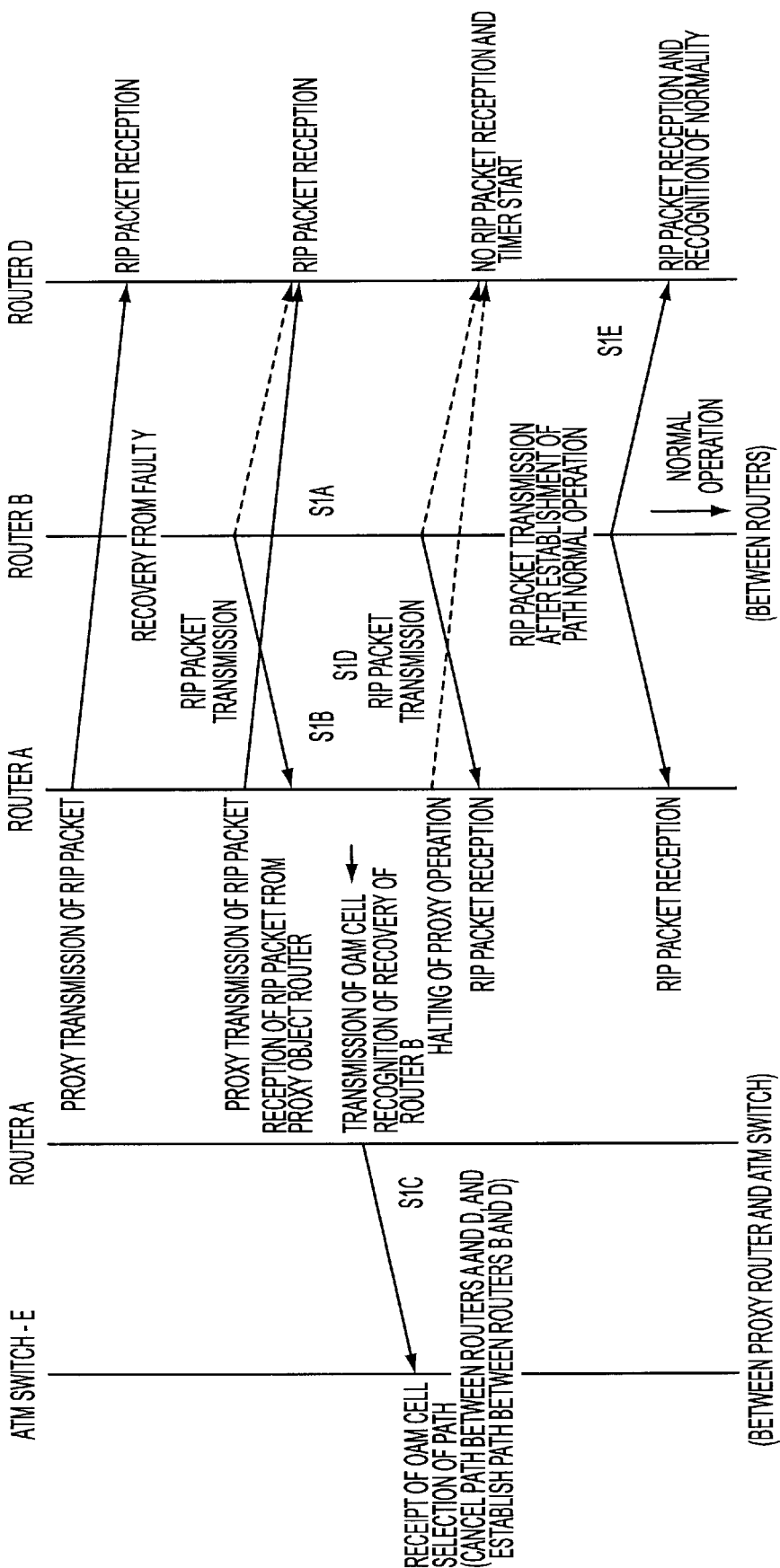
FIG. 46 is a diagram showing the sequence of the operations described in FIG. 32 from the time a fault recovery occurs until the proxy activity has ended.

An explanation will now be given for termination of the proxy function by the router A when the router B has recovered from the fault. In FIG. 46 is shown the sequence of the operations performed by the ATM switch (E) 1 and the individual routers to terminate the proxy function of the router A when the router B has recovered from the fault.

When the fault at the router B is removed (Y in FIG. 46), the router B simultaneously transmits RIP packets to the peripheral routers (step S1A). Upon receiving the RIP packet from the router B, the router A immediately understands that the router B has recovered from the fault and halts the activities it was performing as the proxy (step S1B). This processing corresponds to the processing at STEPs 0601 to 0604 and 0606 to 0608 in FIG. 24.

The router A transmits to the ATM switch (E) 1 an OAM cell indicating the fault has been removed through the logical path (VPA, VCA2) which is used during the proxy operation (step S1C).

Furthermore, the router A instructs the port (9) not to accept frames addressed to the router B and also not to respond to ARP packets for which the IP address is that of the router B. The router A also halts the transmission of the RIP packets as the proxy for the router B (step S1D). It should be noted, however, that the router A monitors the RIP packets output by the router B to detect a fault were one to occur.

FIG. 47 is a flowchart for the path switching processing performed by the ATM switch (E) 1 at the time of recovery. Upon receiving an OAM cell from the router A (STEP 1001), as is shown in FIG. 48 the ATM switch (E) 1 deletes from the logical path management table the logical path with the VPI of "$V_PA$" and the VCI of "$V_CA2$, "0 which was used for the receipt of the OAM cell, and changes the use state of the malfunctioning logical path to a "." (arrow *1 in FIG. 48) (STEP 1002).

Figure 49:
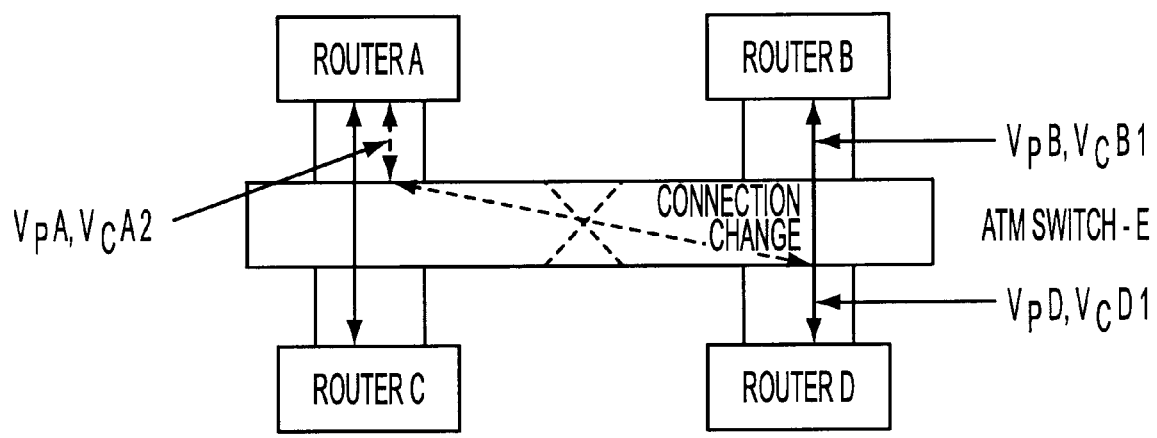
FIG. 49 is a diagram for explaining the operation performed by the ATM switch at the time of the recovery from the fault in FIG. 32.

The ATM switch (E) 1 hereinafter employs the rewritten contents of the table to perform switching, as is shown in FIG. 49, and enters the OAM waiting state in case a fault should occur (STEP 1003).

During the switching of the logical path, the logical path for the router B (the router A is acting as a proxy) from the router D is temporarily disconnected; however, when the ATM switch (E) 1 has completed the switching, the router D receives an RIP packet from the router B and continues its normal operation (step S1E in FIG. 46).

Method For Setting a Proxy Path to an ATM Switch in Advance

An explanation will now be given for a method whereby, in the network in FIG. 32, a proxy logical path used upon the occurrence of a fault is manually registered in advance in the ATM switch (E) 1, and only upon receiving a fault notification from a proxy router is the proxy logical path automatically selected.

Assumptions

Figure 50:
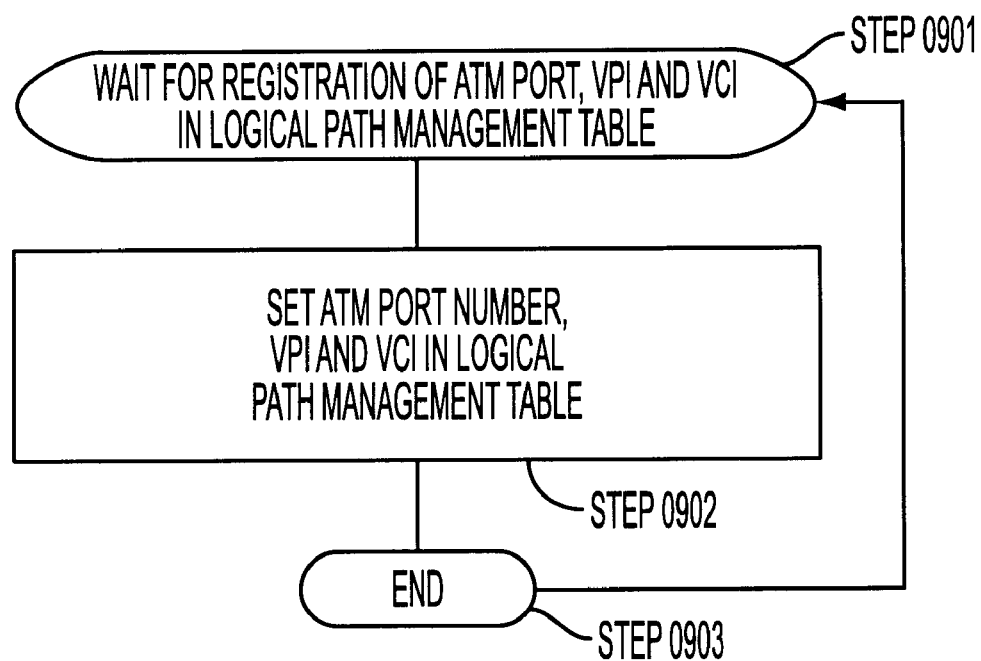
FIG. 50 is a flowchart for explaining the registration at the ATM switch of a proxy logical path used when a fault occurs.
Figure 52:
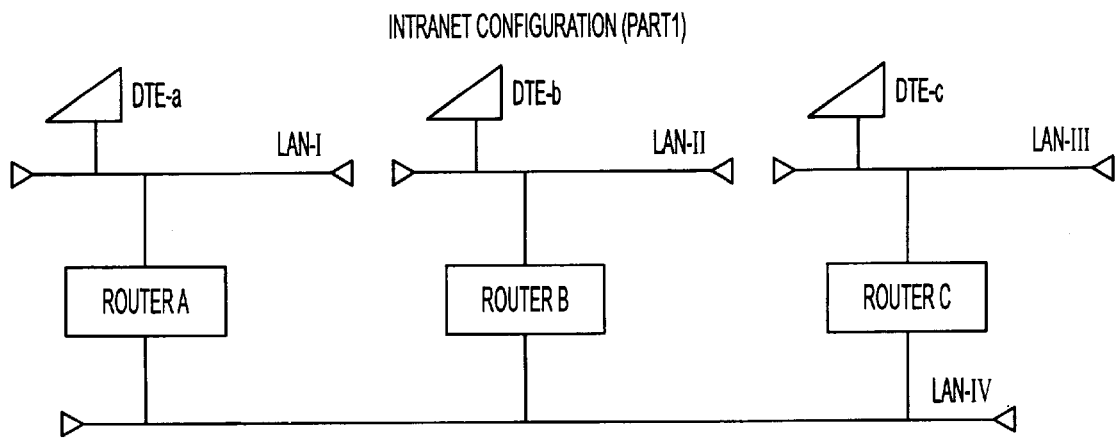
FIG. 52 is a diagram for explaining an example configuration for the Intranet.
Figure 53:
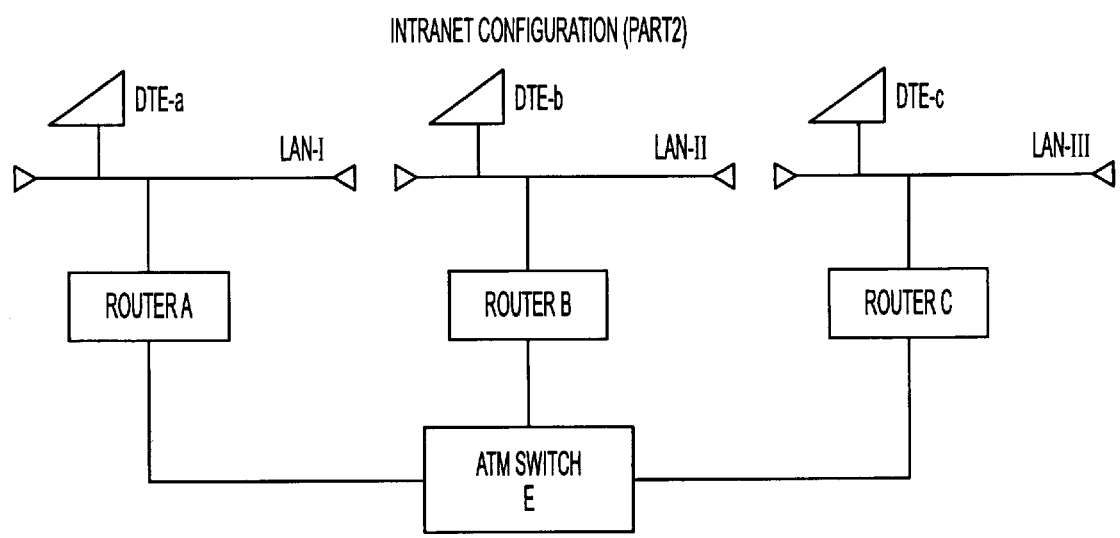
FIG. 53 is a diagram for explaining another example configuration for the Intranet.
Figure 54:
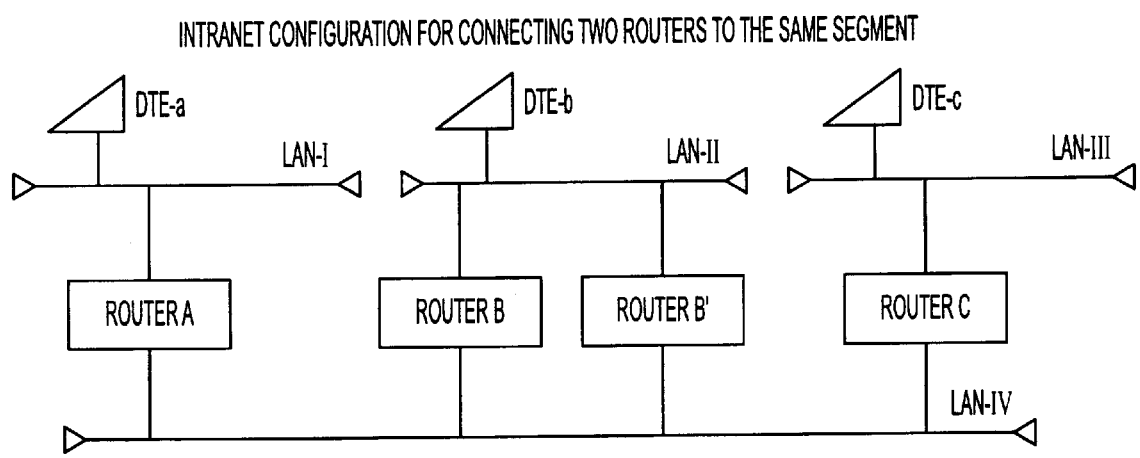
FIG. 54 is a diagram for explaining an example Intranet configuration wherein two routers are connected to a single segment.
Figures 55, 56:
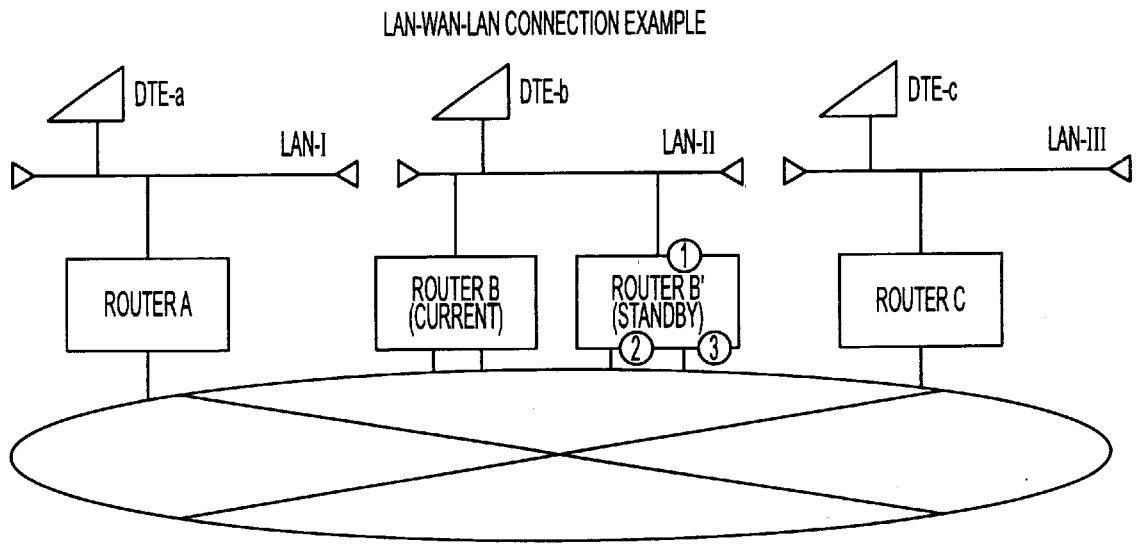
FIG. 55 is a diagram for explaining an example LAN-WAN-LAN configuration.
FIG. 56 is an example table set in a standby router in FIG. 55.

The following assumptions are made. In accordance with the flowchart in FIG. 50, the logical path is manually registered in advance in the ATM switch (e) 1 in order to switch the logical paths upon the occurrence of a fault. That is, after the waiting state for the registration of ATM ports, and the VPIs and the VCIs in the logical path management table (STEP 0901), the ATM port numbers, the VPIs and the VCIs are manually registered in the logical path management table (STEP 0902). As a result, the logical path management table in FIG. 51A (arrow *1) is provided in which proxy logical paths used upon the occurrence of a fault are registered.

The other assumptions are the same as those used for "when subordinate networks of a proxy object router are a LAN and an ATM" in the network in FIG. 32.

Operation Performed by Router A Before a Fault Occurs at Router B

The operation performed by the router A before a fault occurs at the router B is the same as the operation in the network in FIG. 32, when the subordinate networks of the proxy object router are the LAN and the ATM.

Example Processing when a Fault Occurs at Router B

The same processing is performed as at STEPs 0501 to 0506 in FIG. 18, and as is performed at STEP 0706 in FIG. 21 when a fault occurs at a B in the subordinate LAN and ATM networks of the proxy object router.

The router A employs the logical path ($V_PA$, $V_CA2$) used for proxy operations to transmit to the ATM switch (E) 1 an OAM cell indicating the occurrence of a fault, so that the ATM switch (E) 1 can switch the connection for the logical path. This process corresponds to that at STEP 0708 in FIG. 21.

Upon receiving the OAM cell, the ATM switch (E) 1 examines the logical path management table in FIG. 51B to find the logical path with the VPI of "$V_PA$" and the VCI of "$V_CA2$," along which the OAM cell is received, and the logical path which was connected to the malfunctioning router destination.

The use state of the pertinent path is set to "." (arrow *1 in FIG. 51) and the use state of the malfunctioning path is set to "X" (arrow *2). The updated contents of this table are hereinafter employed for switching the path. This processing corresponds to the processing at STEPs 0801 to 0803 in FIG. 42.

The router D initiates the RIP packet waiting timer when no RIP packet is received from the router B. The router D might assume that a fault has occurred at the router B because no RIP packet has arrived; however, when the router A takes the place of the router B and transmits an RIP packet to the router D after the ATM switch (E) 1 switches the logical paths, the router D ascertains that the router B is operating normally. This process corresponds to that at STEP 0508 in FIG. 18.

Communication among Terminals DTE-b to DTE-d when a Fault Occurs at Router B

This is the same as "communication among terminals DTE-b to DTE-d when a fault occurs at router B" for the case where the subordinate networks of the proxy object router are a LAN and an ATM, except that the ATM switch (E) 1 refers to a logical path management table in FIG. 51C (arrow *1), instead of the table in FIG. 44D, and selects for the output of a received cell the logical path for which the VIP of the port P3 is "$V_PD$" and the VCI is "$V_CD1$."

Also, as one difference, the ATM switch (E) 1 refers to a logical path management table in FIG. 51D (arrow *1), instead of the logical path management table in FIG. 44H, selects the logical path for which the VPI of the port P4 is "$V_PA$" and the VCI is "$V_CA2$," and outputs the received cell.

Proxy Termination of Router A when Router B Recovers from a Fault

An explanation will be given for the proxy termination process for the router A when the router B recovers from a fault. In FIG. 46, when the router B has recovered from the fault (Y in FIG. 46), it simultaneously transmits RIP packets to the peripheral routers (step S1A). Upon receiving the RIP packet from the router B, the router A immediately understands that the router B has recovered, and halts the proxy operation (step S1B). This processing corresponds to that at STEPs 0601 to 0604 and 0606 to 0608 in FIG. 24.

Along the logical path ($V_PA$, $V_CA2$) which is used during the proxy operation, the router A transmits to the ATM switch (E) 1 an OAM cell indicating that the fault has been removed (step S1C).

Furthermore, the router A instructs the port (9) not to accept frames addressED to the router B, and also not to respond to ARP packets for which the IP address is that of the router B. The router A also halts the transmission of RIP packets as the proxy of the router B (step S1D). It should be noted, however, that the router A monitors the RIP packets from the router B in case a fault should occur.

In FIG. 47, upon receiving the OAM cell from the router A (STEP 1001), the ATM switch (E) 1 searches for the normal operation logical path in the logical path management table in FIG. 51D in order to switch back to the normal operation logical path from the logical path with the VIP of "$V_PA$" and the VCI of "$V_CA2$," which is used for the reception of the OAM cell. The ATM switch (E) 1 sets the use state of the pertinent path to a "." (arrow *1 in FIG. 51D) and the use state of the proxy path to an "X" (arrow *2). The contents of this table are hereinafter employed for switching the logical path. This processing corresponds to that at STEPs 1001 to 1003 in FIG. 47.

During the switching of the connections of the logical paths, the logical path for the router B (for which the router A is functioning as a proxy) to the router D is disconnected; however, when the ATM switch (E) 1 has completed the connection switching, the router D receives an RIP packet from the router B and continues its normal operation (step S1E in FIG. 46).

As is described in the above embodiment, the method of the present invention for saving a subordinate LAN can prevent an increase in the manufacturing costs due to the provision of two routers in a single segment, and a proxy router can be employed when a fault occurs at a router which is regularly used so that communication between a specific segment and another segment is not interrupted.

Furthermore, in the system that employs the saving method of the present invention, when a fault occurs at a regularly used router, its proxy router performs the same operation. Therefore, a terminal (DTE) connected to the proxy object router does not require a function by which, when a specific router malfunctions, the connection is switched to another router.

The above described embodiment is employed only for explaining the present invention, and the present invention is not limited to this embodiment. The protective scope of the present invention is defined by claims, and the equivalent of the range of the claims is also included within the protective scope of the present invention.

What is claimed is:

1. A router network comprising:
   a plurality of local area networks, between which data communications are performed using an Internet protocol or internetwork packet protocol; and
   a plurality of routers, each having input/output line sections for inputting and outputting internet protocol packets with a form corresponding to a specification for a media, to which a router is connected, and a table, on which a network environment is set for subordinate segments serviced by a specific router,
   wherein the network environment set for subordinate segments serviced by the specific router is copied to be set on a different table at a different router in advance, as well as a different network environment is set for subordinate segments serviced by the different router on the different table, and
   wherein when a fault occurs at the specific router, the different router is used as a proxy router to provide communication support for the subordinate segments on behalf of the specific router as well as for the subordinate segments for the different router in accordance with the network environment set on the different table.

2. A router network according to claim 1, wherein, when the recovery of said specific router from said fault is detected while said different router is acting as said proxy router, said different router releases said network environment which was set in advance for said subordinate segment of said specific router.

3. A router network according to claim 1, wherein, when said different router is being operated as a proxy router, a destination MAC (Media Access Control) address provided for an input frame is employed to determine the MAC address of a transmission source for a frame which is to be output.

4. A router network according to claim 1, wherein, when a frame is received from a port opposite a router connected to a dedicated line or to a public telephone line, while said different router is being operated as a proxy router, the MAC address of said transmission source is determined in accordance with the port at which said frame is input.

5. A router network according to claim 1, wherein, when a frame is received from a port opposite a router connected across an asynchronous transfer mode (ATM) network, while said different router is being operated as a proxy router, the MAC address of a transmission source for a frame to be output is determined in accordance with an input port and an input logical path.

6. A router network according to claim 1, wherein, when said different router is being operated as a proxy router, said different router takes the place of said specific router, which has malfunctioned, and transmits an RIP packet to the other routers.

7. A router network according to claim 1, wherein said specific router and said different router are connected to the same ATM network, and through an OAM (Operation, Administration and Maintenance) cell, said different router queries said ATM network setup for a logical path, with a router opposite said specific router where said fault has occurred, which is required in order for said different router to serve as a proxy router for said specific router.

8. A router network according to claim 1, wherein said specific router and said different router are connected to the same ATM network, and said different router employs an OAM (Operation, Administration and Maintenance) cell to transmit to said ATM network a path identifier for a router opposite said specific router where said fault has occurred, and queries said ATM network the connection of a logical path in accordance with said path identifier, in order for said different router to serve as a proxy router for said specific router.

9. A router network according to claim 8, wherein an ATM switch constituting said ATM network employs as a trigger said OAM (Operation, Administration and Maintenance) cell, which is transmitted by said router, to reset said logical path based on logical path setup information which was registered in advance.

10. A router network according to claim 9, wherein said logical path is re-set by reading information from said OAM (Operation, Administration and Maintenance) cell transmitted by said router.

11. A router network according to claim 5, wherein said input logical path includes a VPI/VCI (Virtual Path Identifier/Virtual Channel Identifier).

* * * * *